United States Patent

Sato

(10) Patent No.: US 10,423,343 B2
(45) Date of Patent: Sep. 24, 2019

(54) INFORMATION PROCESSING DEVICE AND MEMORY CONTROLLER

(71) Applicant: FUJITSU LIMITED, Kawasaki-shi, Kanagawa (JP)

(72) Inventor: Mitsuru Sato, Machida (JP)

(73) Assignee: FUJITSU LIMITED, Kawasaki (JP)

(*) Notice: Subject to any disclaimer, the term of this patent is extended or adjusted under 35 U.S.C. 154(b) by 72 days.

(21) Appl. No.: 15/616,989

(22) Filed: Jun. 8, 2017

(65) Prior Publication Data

US 2018/0032272 A1 Feb. 1, 2018

(30) Foreign Application Priority Data

Jul. 29, 2016 (JP) ................................ 2016-149263

(51) Int. Cl.
| | |
|---|---|
| *G06F 12/00* | (2006.01) |
| *G06F 13/00* | (2006.01) |
| *G06F 3/06* | (2006.01) |
| *G06F 12/06* | (2006.01) |
| *G06F 11/07* | (2006.01) |

(52) U.S. Cl.
CPC ............ *G06F 3/0619* (2013.01); *G06F 3/065* (2013.01); *G06F 3/0688* (2013.01); *G06F 11/07* (2013.01); *G06F 12/0638* (2013.01); *G06F 2212/1024* (2013.01); *G06F 2212/205* (2013.01)

(58) Field of Classification Search
CPC ...... G06F 3/0619; G06F 3/0688; G06F 3/065; G06F 12/0638; G06F 2212/205; G06F 2212/1024

USPC ......................................................... 711/102
See application file for complete search history.

(56) References Cited

U.S. PATENT DOCUMENTS

| | | | | | |
|---|---|---|---|---|---|
| 5,530,673 | A | * | 6/1996 | Tobita | ................... G06F 3/0601 365/185.04 |
| 5,754,888 | A | * | 5/1998 | Yang | ..................... G06F 3/0601 710/52 |
| 6,065,097 | A | * | 5/2000 | Feierbach | ........... G06F 12/0884 711/118 |
| 6,078,520 | A | * | 6/2000 | Tobita | ................. G06F 11/1433 365/185.09 |

(Continued)

FOREIGN PATENT DOCUMENTS

| | | |
|---|---|---|
| JP | 2005-235182 | 9/2005 |
| WO | 2006093201 | 9/2006 |

*Primary Examiner* — Sheng Jen Tsai
(74) *Attorney, Agent, or Firm* — Fujitsu Patent Center

(57) ABSTRACT

An information processing device includes a main memory including a non-volatile memory and a volatile memory with access speed higher than the non-volatile memory, the volatile memory storing data in the non-volatile memory, a processor that issues a read request, a write request and a snapshot request and a memory controller that reads, in response to the read request, data in the volatile memory, writes, in response to the write request, write data in the volatile memory and also writes a write history in a sequential manner to the non-volatile memory, performs, in response to the snapshot request, snapshot processing of recording in non-volatile memory a write position of the write history up to a time of a snapshot, and performs, after the snapshot processing, data restoration processing of writing the written data at the write position in the write history to the non-volatile memory.

11 Claims, 23 Drawing Sheets

(56) References Cited

U.S. PATENT DOCUMENTS

| | | | |
|---|---|---|---|
| 6,810,470 B1* | 10/2004 | Wiseman | G06F 13/1631 711/156 |
| 6,981,114 B1* | 12/2005 | Wu | G06F 11/1469 711/112 |
| 7,509,358 B1* | 3/2009 | Bingham | G06F 11/1451 |
| 7,603,395 B1* | 10/2009 | Bingham | G06F 11/1471 |
| 7,689,597 B1* | 3/2010 | Bingham | G06F 11/1471 707/999.2 |
| 7,765,190 B1* | 7/2010 | Bingham | G06F 11/1458 707/649 |
| 7,971,091 B1* | 6/2011 | Bingham | G06F 11/1446 714/6.12 |
| 9,058,244 B2* | 6/2015 | Banikazemi | G06F 11/00 |
| 9,135,181 B2* | 9/2015 | Eleftheriou | G06F 12/0888 713/400 |
| 9,229,809 B2* | 1/2016 | Moss | G06F 11/1076 |
| 2004/0128470 A1* | 7/2004 | Hetzler | G06F 12/0804 711/209 |
| 2005/0138409 A1* | 6/2005 | Sheriff | G06F 21/572 726/26 |
| 2005/0182893 A1* | 8/2005 | Suh | G06F 12/0893 711/103 |
| 2005/0185472 A1* | 8/2005 | Randell | G06F 11/1068 365/185.33 |
| 2005/0283598 A1* | 12/2005 | Gaskins | G06F 9/4403 713/2 |
| 2006/0041602 A1* | 2/2006 | Lomet | G06F 11/1471 |
| 2006/0129716 A1* | 6/2006 | Saito | G06F 3/0611 710/52 |
| 2006/0195631 A1* | 8/2006 | Rajamani | G06F 13/1684 710/51 |
| 2008/0114930 A1* | 5/2008 | Sanvido | G06F 12/0866 711/113 |
| 2008/0307152 A1* | 12/2008 | Nakanishi | G06F 11/1666 711/102 |
| 2009/0044201 A1* | 2/2009 | Lee | G06F 9/542 719/318 |
| 2009/0089508 A1* | 4/2009 | Trika | G06F 12/0804 711/135 |
| 2009/0240664 A1* | 9/2009 | Dinker | G06F 12/0842 |
| 2010/0169886 A1* | 7/2010 | Troxel | G06F 11/184 718/101 |
| 2010/0235568 A1* | 9/2010 | Inamura | G06F 1/30 711/103 |
| 2011/0225367 A1* | 9/2011 | Rajvanshy | G06F 12/0866 711/118 |
| 2011/0239021 A1* | 9/2011 | Vedder | G06F 1/263 713/323 |
| 2013/0254583 A1* | 9/2013 | Rifani | G06F 13/4291 713/400 |
| 2013/0297855 A1* | 11/2013 | Gupta | G06F 3/0656 711/103 |
| 2014/0281131 A1* | 9/2014 | Joshi | G06F 12/0804 711/103 |
| 2014/0351525 A1* | 11/2014 | Chen | G06F 3/0658 711/147 |
| 2015/0039824 A1* | 2/2015 | Furlong | G06F 12/0868 711/113 |
| 2015/0261674 A1* | 9/2015 | Wei | G06F 12/0866 711/135 |
| 2016/0328488 A1* | 11/2016 | Lytle | G06F 9/54 |
| 2017/0123995 A1* | 5/2017 | Freyensee | G06F 12/10 |
| 2018/0018258 A1* | 1/2018 | Nalli | G06F 12/0238 |

\* cited by examiner

FIG.11

| SEQ | R/W | NVADD | DATA | HIT/MISS |
|---|---|---|---|---|
| | | OPERATIONAL SEQUENCE | | |
| | | STATE_0 | | |
| 1 | R | 5 | - | HIT |
| | | STATE_1 | | |
| 2 | R | 6 | - | MISS |
| | | STATE_2 | | |
| 3 | W | 1 | 0x0001 | HIT |
| | | STATE_3 | | |
| 4 | W | 2 | 0x0002 | MISS |
| | | STATE_4 | | |
| 5 | SNAPSHOT CREATE INSTRUCTION | | | |
| | | STATE_5A, 5B | | |
| 6 | RESUME OPERATION WITH ACTIVATION OF POWER AFTER INTERRUPTION OF POWER | | | |
| | | STATE_6 | | |

FIG.12

STATE_0, 1 (INITIAL STATE AND AFTER OPERATIONAL SEQUENCE SEQ1)

NV_LGMEM

| INDEX | V | NVADD | DATA | M |
|---|---|---|---|---|
| 0 | 1 | 3 | 0x0003 | 0 |
| 1 | 0 | - | - | - |
| 2 | 0 | - | - | - |

WPTR: 1
RPTR: 0

V DMEM

| VADD | DATA |
|---|---|
| 0 | 0x0003 |
| 1 | 0x0005 |
| 2 | 0x0000 |
| 3 | 0x0007 |

NV DMEM

| NVADD | DATA |
|---|---|
| 0 | 0x0000 |
| 1 | 0x0000 |
| 2 | 0x0000 |
| 3 | 0x0000 |
| 4 | 0x0004 |
| 5 | 0x0005 |
| 6 | 0x0006 |
| 7 | 0x0007 |

TAG

| V | NVADD | D |
|---|---|---|
| 1 | 3 | 1 |
| 1 | 5 | 0 |
| 1 | 1 | 0 |
| 1 | 7 | 0 |

FIG.21 STATE_5A (COPYING OF WRITE DATA COMPLETE AFTER SNAPSHOT CREATE INSTRUCTION IN OPERATIONAL SEQUENCE SEQ5)

STATE_5B (COPYING OF WRITE DATA INCOMPLETE AFTER SNAPSHOT CREATE INSTRUCTION IN OPERATIONAL SEQUENCE SEQ5)

FIG.23

STATE_6 (AFTER RESUMPTION)

TAG

| V | NVADD | D |
|---|---|---|
| 0 | - | 0 |
| 0 | - | 0 |
| 0 | - | 0 |
| 0 | - | 0 |

V_DMEM

| VADD | DATA |
|---|---|
| 0 | - |
| 1 | - |
| 2 | - |
| 3 | - |

NV_DMEM

| NVADD | DATA |
|---|---|
| 0 | 0x0000 |
| 1 | 0x0001 |
| 2 | 0x0002 |
| 3 | 0x0003 |
| 4 | 0x0004 |
| 5 | 0x0005 |
| 6 | 0x0006 |
| 7 | 0x0007 |

NV_LGMEM

| INDEX | V | NVADD | DATA | M |
|---|---|---|---|---|
| 0 | 0 | - | - | 0 |
| 1 | 0 | - | - | 0 |
| 2 | 0 | - | - | 0 |

WPTR: 0

RPTR: 0

INFORMATION PROCESSING DEVICE AND MEMORY CONTROLLER

CROSS-REFERENCE TO RELATED APPLICATION

This application is based upon and claims the benefit of priority of the prior Japanese Patent Application No. 2016-149263, filed on Jul. 29, 2016, the entire contents of which are incorporated herein by reference.

FIELD

The present invention relates to an information processing device and a memory controller.

BACKGROUND

A computer as an information processing device includes a central processing unit (CPU, hereinafter referred to as processor), a main memory connected to the CPU via a bus, an input-output device connected to the CPU via a bus, and the like. To the input-output device, an external large-capacity auxiliary memory is connected, and an external network is connected.

In the main memory, a program or data in the auxiliary memory is stored. The processor frequently accesses the main memory to execute reading of a program instruction or reading and writing of data. Therefore, the access speed of the main memory is desired to be high.

As the main memory for which high-speed properties are desired, a dynamic random access memory (DRAM) or a static random access memory (SRAM) is generally used. The DRAM and the SRAM are high in access speed, but are a volatile memory that loses data when the power is turned off.

For the large-capacity auxiliary memory, a hard disk drive (HDD) or a solid state drive (SSD) formed of a flash memory is used. Though large in capacity, these auxiliary memories are slow in access speed and not suitable as the main memory that is arranged in the closest position to the processor.

In recent years, non-volatile memories having an access speed between that of a DRAM or an SRAM and that of an HDD or an SSD have been developed. Examples include a phase change RAM (PCM), a resistive RAM (ReRAM), and a magnetoresistive RAM (MRAM). These non-volatile memories do not lose data even when the power is turned off and less costly than a DRAM or an SRAM, but are slower in access speed than the volatile memory of the DRAM or the SRAM.

There have been made proposals to use, in a computer including a processor and a main memory, a memory combining a high-speed volatile memory and a low-speed but large-capacity non-volatile memory. Examples include International Publication Pamphlet No. WO 2006/093201 and Japanese Laid-open Patent Publication No. 2005-235182.

SUMMARY

In order to allow, in the case where the power is interrupted due to a sudden failure, the saving of data that is in the main memory and the restoration of the data after the restoration of power, the snapshot of the data that is in the main memory is created at a predetermined timing. In that case, copying all of the data in a DRAM that is the main memory to the non-volatile memory takes a long time. In order to create the snapshot, an application program is demanded to control complex processing.

One aspect of the embodiment is an information processing device including: a main memory that includes a non-volatile memory and a volatile memory that has access speed higher than the non-volatile memory, the volatile memory storing at least a part of data in a data area of the non-volatile memory; a processor that issues a read request, a write request and a snapshot request to data in the main memory; and a memory controller that processes the request from the processor, wherein the memory controller reads, in response to the read request, data corresponding to the read request in the volatile memory, writes, in response to the write request, write data to an area corresponding to the write request in the volatile memory and also writes a write history in a sequential manner to the non-volatile memory, performs, in response to the snapshot request, snapshot processing of recording in non-volatile memory a write position of the write history up to a time of a snapshot, and performs, after the snapshot processing, data restoration processing of writing write data at the write position in the write history to a data area of the non-volatile memory.

According to a first aspect, the speed can be increased for the acquisition of the snapshot.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating the operational sequences in the specific example.

FIG. 12 is a diagram illustrating the tag, the volatile data memory, the non-volatile log memory, and the non-volatile data memory in the states STATE_0 and STATE_1.

FIG. 23 is a diagram illustrating a state STATE_6 after the initializing processing after the resumption of the operation after the activation of power.

DESCRIPTION OF EMBODIMENTS

Figure 1:
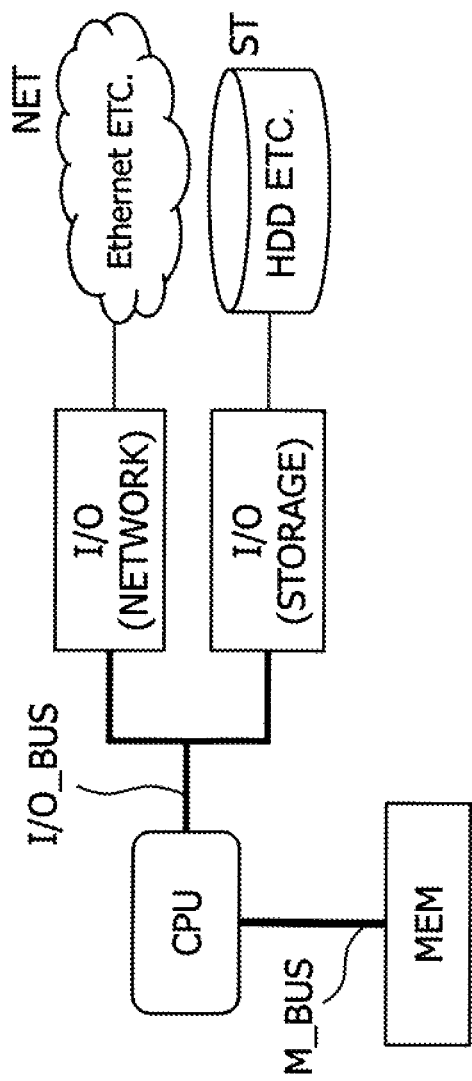
FIG. 1 is a diagram illustrating a configuration example of an information processing device.

FIG. 1 is a diagram illustrating a configuration example of an information processing device. A processor CPU is connected to a main memory MEM via a memory bus M_BUS. A memory controller that performs the processing of access to the main memory for a read request or a write request (both are referred to as a "memory access request") that is made to the main memory MEM by the processor CPU is provided in the processor CPU or in the package of the processor CPU.

The processor CPU is connected with an I/O device for a network and for storage via an I/O bus I/O_BUS, such as a PCI bus, over which access is possible to an external network NET, such as an Ethernet network, or large-capacity and non-volatile storage ST, such as an HDD or an SSD.

An information processing device in the embodiments includes the processor CPU and the main memory MEM in FIG. 1. There are times when the operation of the information processing device is interrupted, such as when the power is interrupted due to an unexpected failure. In order to allow the restoration of data that is in the main memory after the recovery from a failure, even when such an unexpected failure has occurred, the information processing device regularly acquires the snapshot of the data (the copy of the data) that is in the main memory. Specifically, an application program includes an instruction to acquire the snapshot at a predetermined timing, and the processor that executes the application program executes the acquisition of the snapshot at the predetermined timing.

The processor acquires the snapshot at a timing such as when the arithmetic processing of array data is completed, for example. At the time of the recovery from a failure after the occurrence of the unexpected failure, the processor restores, in the main memory, the data of the (most recent) snapshot immediately preceding the occurrence of the failure and resumes the execution of the application program from the processing after the snapshot. As such, for the timing of the snapshot, a timing suited for resuming the operation after the recovery is selected.

The main memory MEM is generally configured of a volatile memory, such as a DRAM or an SRAM, but is expected to be configured of a non-volatile memory (such as a PCM, a ReRAM, or an MRAM) in the future.

Figure 2:
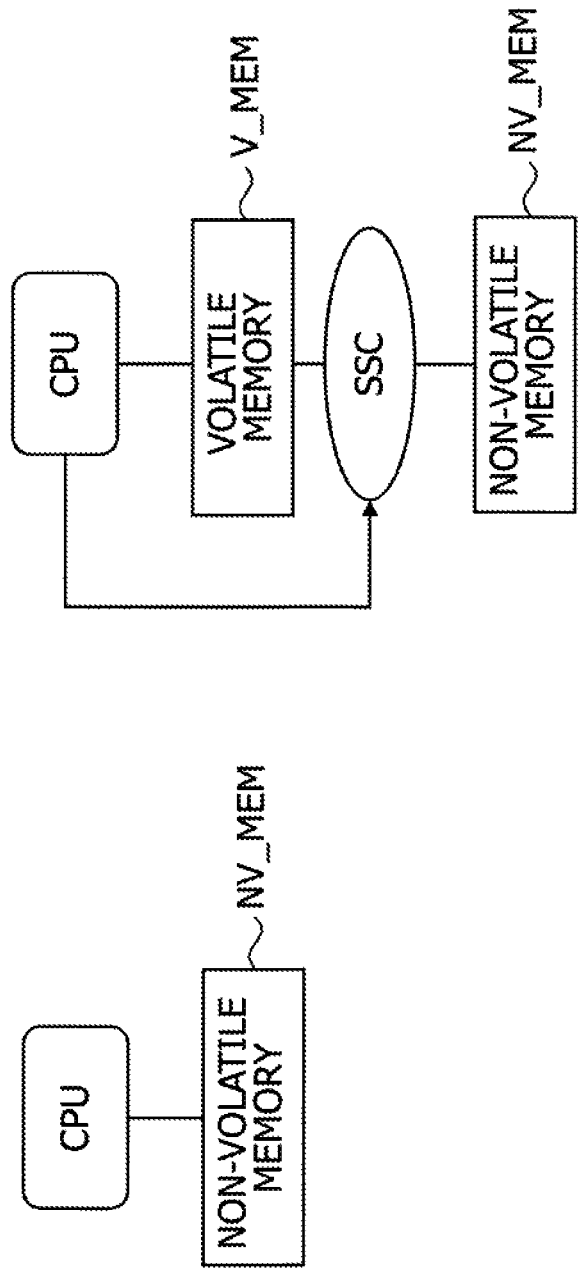
FIG. 2 is a diagram illustrating an example of an information processing device in which a main memory is configured of a non-volatile memory.

FIG. 2 is a diagram illustrating an example of an information processing device in which a main memory is configured of a non-volatile memory. The information processing device in the example illustrated on the left side in FIG. 2 includes the processor CPU and the main memory configured of a non-volatile memory NV_MEM. In this case, upon the recovery from an unexpected failure, data at the time of the failure is saved in the main memory, even without the application program taking a snapshot, since written data by the processor is always saved in the non-volatile memory. However, when it is not possible to know until where a program has been already executed at the time of the failure, an interrupted operation is not able to be continued after the recovery. Since a non-volatile memory is generally slower in access speed than a volatile memory, the memory access time of the processor is long.

Thus, when taking a snapshot at a predetermined timing by the application program in order to be able to continue the interrupted operation after the recovery, all of data in the non-volatile memory should be backed up in external storage or a server across a network for the snapshot. However, since the access speed of the non-volatile memory is slow, it takes a long time for the snapshot.

The information processing device in the example illustrated on the right side in FIG. 2 includes the processor CPU and a main memory configured of a volatile memory V_MEM and the non-volatile memory NV_MEM. The processor CPU executes the memory access with respect to the volatile memory V_MEM in a normal operation and, in the case of taking a snapshot at a predetermined timing, causes a snapshot controller SSC to copy data that is in the volatile memory V_MEM to the non-volatile memory NV_MEM. As such, the application program does not have to perform complex processing for the sake of the snapshot. However, since the access speed of the non-volatile memory is slow, the time for copying the data that is in the volatile memory to the non-volatile memory for the snapshot is long.

[First Embodiment]

Figure 3:
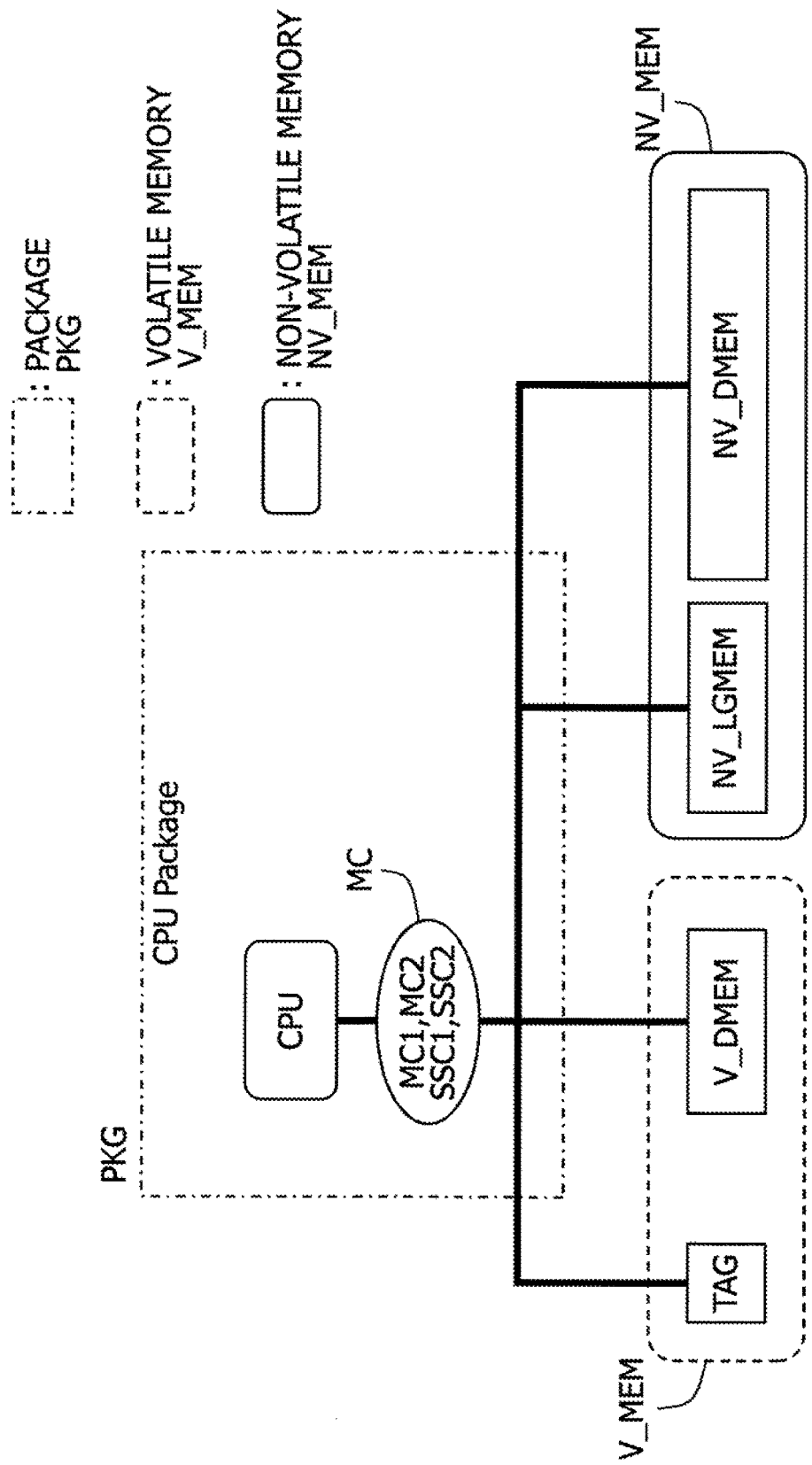
FIG. 3 is a diagram illustrating the configuration of an information processing device in this embodiment.

FIG. 3 is a diagram illustrating a configuration of an information processing device in this embodiment. The information processing device in FIG. 3 includes a main memory (including NV_MEM and t V_MEM) including the non-volatile memory NV_MEM and the volatile memory V_MEM (V_DMEM) that is faster in access speed than the non-volatile memory, and the processor CPU that requests reading and writing of data in the main memory. Further, a memory controller MC that processes a request from the processor is included. A data memory area V_DMEM of the volatile memory V_MEM stores at least a part of data of a data area NV_DMEM of the non-volatile memory NV_MEM.

The memory controller MC includes memory controllers MC1 and MC2 that perform the access control to the memory regarding a read request and a write request from the processor and snapshot controllers SSC1 and SSC2 that perform the control regarding a request for a snapshot from the processor.

Together with the processor CPU, the memory controller MC is stored in a same package PKG. Note that the memory controller MC may be embedded in the chip of the processor CPU. Alternatively, the memory controller MC may be stored in a different package from the processor.

The volatile memory V_MEM includes the volatile data memory V_DMEM that stores data and a tag TAG. Meanwhile, the non-volatile memory NV_MEM includes the non-volatile data memory NV_DMEM that is the data area to store data and a non-volatile log memory NV_LGMEM that stores a write history. The volatile data memory V_DMEM and the tag TAG may be provided in the same chip of the volatile memory V_MEM or may be different chips. In a similar manner, the non-volatile data memory NV_DMEM and the non-volatile log memory NV_LGMEM may be provided in the same chip of the non-volatile memory NV_MEM or may be different chips. The non-volatile log memory NV_LGMEM may be provided in the storage area of the non-volatile data memory NV_DMEM.

Next, a read request, a write request, a snapshot request, and a resuming operation at the activation of power after the interruption of power after the snapshot processing by the processor will be described.

Firstly, the memory controller performs, with respect to the volatile memory V_MEM that is capable of high-speed access, a read request or a write request to the main memory. In the case where the data of a read address or a write address is stored in the volatile memory, the memory controller, for reading, reads the data in the volatile memory and output a data response to the processor or, for writing, overwrites the data in the volatile memory with write data. In the case where the data is not stored in the volatile memory, for reading, the data is read from the non-volatile memory NV_MEM and stored into the volatile memory V_MEM, and a data response is output to the processor by the memory controller. For writing, the data is read from in the non-volatile memory NV_MEM and stored into the volatile memory V_MEM, and the data in the volatile memory is overwritten with write data.

That is, the relationship of the volatile memory and the non-volatile memory resembles that of a cache memory and a main memory. At least a part of data in the non-volatile memory is stored in the volatile memory. Since the memory controller performs a memory access request mainly to the volatile memory V_MEM, high-speed access is possible.

Secondly, in the case of a write request, the memory controller writes the write history (the write address and the write data) to the non-volatile log memory NV_LGMEM in the non-volatile memory, in addition to overwriting the data in the volatile memory with the write data as described earlier. That is, all of the write history between snapshots is written in a sequential manner into the non-volatile log memory. With the write request, the write data is not written to the non-volatile data memory NV_DMEM in the non-volatile memory.

Thirdly, in the case of a snapshot request, the memory controller performs the snapshot processing of recording or storing, in the non-volatile memory, the position of the history that has been written up to the snapshot request. Preferably, the position of the history immediately preceding the snapshot request is recorded. Specifically, the recording is done with a mark bit described later. Since the snapshot processing can be completed in a very short time, the operation of an application program is not interrupted for a long time.

Fourthly, after the snapshot processing, the memory controller writes the write data of the write history to the non-volatile memory on the basis of the write address of the write history in the non-volatile log memory. This writing is able to be performed in the background, while the processor is executing the application program.

Fifthly, at the time of resuming the operation at the activation of power after the interruption of power due to a failure, the write data of the write history up to the snapshot is restored in the non-volatile data memory, and all of the data in the volatile memory is cleared due to the interruption of power. Thus at the time of resuming the operation, the write history after the snapshot in the non-volatile data memory is cleared. Accordingly, in the case of resuming the operation, the resumption is able to be from the timing of the snapshot last taken. Further, in a write operation or a read operation thereafter, at least a part of the data in the non-volatile data memory is written into the volatile memory along with a tag miss. This operation resembles that of a cache registration. Therefore, the volatile memory is provided with the tag area TAG that stores the address and the valid bit of each block in the volatile data memory V_DMEM.

At the time of resuming the operation at the activation of power after the interruption of power, an OS checks the mark bit of the write history in the non-volatile memory to check whether the data of the write history is all restored in the data area of the non-volatile memory. In the case where the restoration is yet to be done, the write data of the write history up to the position of the mark bit is written into the data area of the non-volatile memory, and the data at the time of the snapshot is restored.

The processing of memory access, the processing for a snapshot, and the processing after a snapshot by the processor for the first embodiment are illustrated in FIGS. 7 to 10 described later.

[Second Embodiment]

Figure 4:
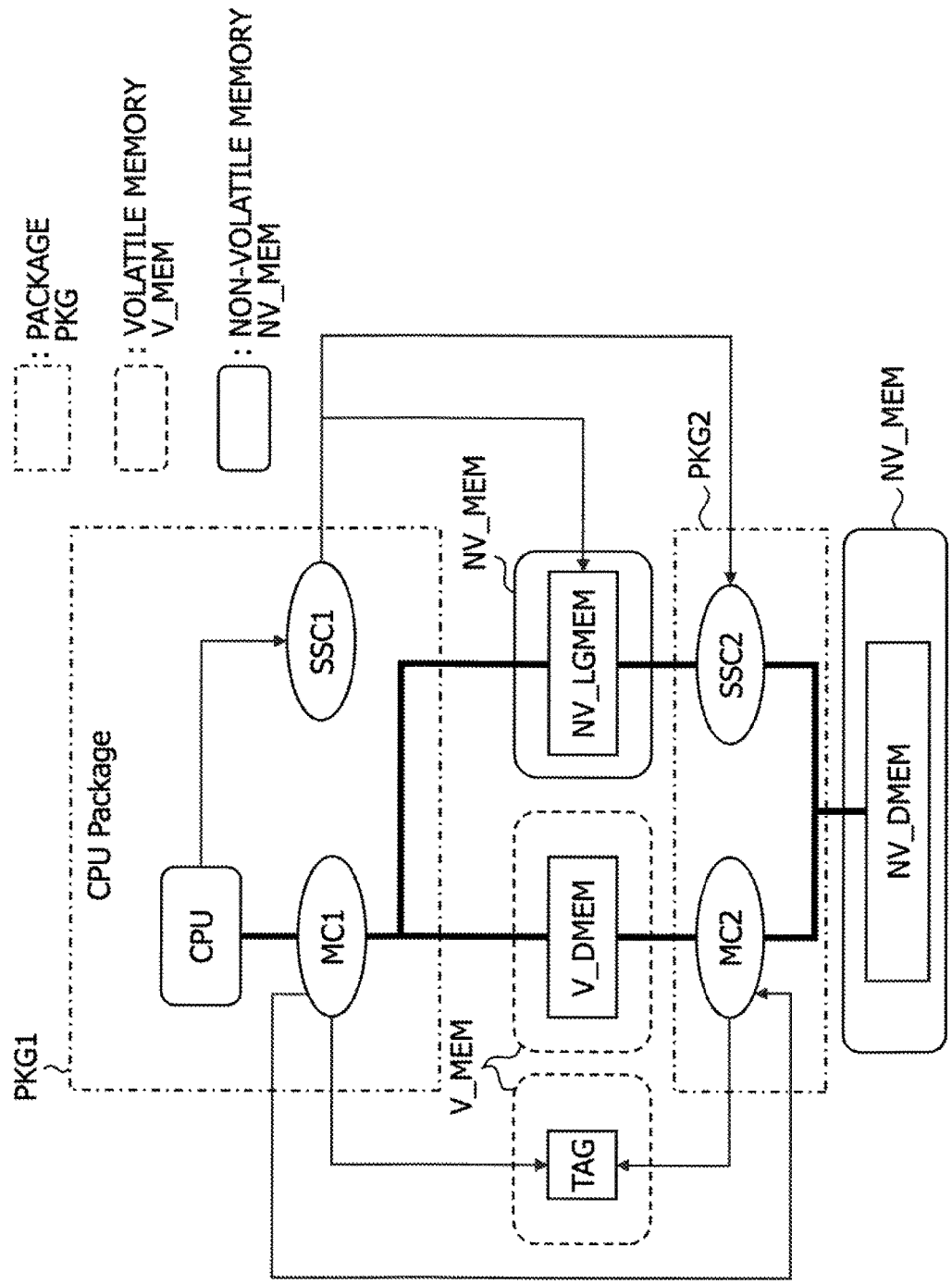
FIG. 4 is a diagram illustrating a different configuration example of an information processing device for this embodiment.

FIG. 4 is a diagram illustrating a different configuration example of an information processing device for this embodiment. In the configuration example in FIG. 4, the four controllers MC1, MC2, SSC1, and SSC2 of the memory controller MC are provided in different positions from the example of FIG. 3.

In a first package PKG1 in which the processor CPU is mounted, in FIG. 4, the first memory controller MC1 that mainly controls a read operation and a write operation and the first snapshot controller SSC1 that controls the snapshot processing are mounted. In a second package PKG2, the second memory controller MC2 is mounted that performs the control of reading data at an address in the non-volatile data memory NV_DMEM and writing (registering) the data to the volatile data memory, in the case where the data of the address is not stored in the volatile data memory V_DMEM at the time of reading or writing. Further, in the second package PKG2, the second snapshot controller SSC2 is mounted that performs the control of copying, to the non-volatile data memory NV_DMEM, the write data of the write history that is stored in the non-volatile log memory NV_LGMEM after the snapshot processing.

Note that the four controllers MC1, MC2, SSC1, and SSC2 may be mounted in the same package as for the processor CPU as in FIG. 3 or may be embedded in the chip of the processor CPU.

Figure 5:
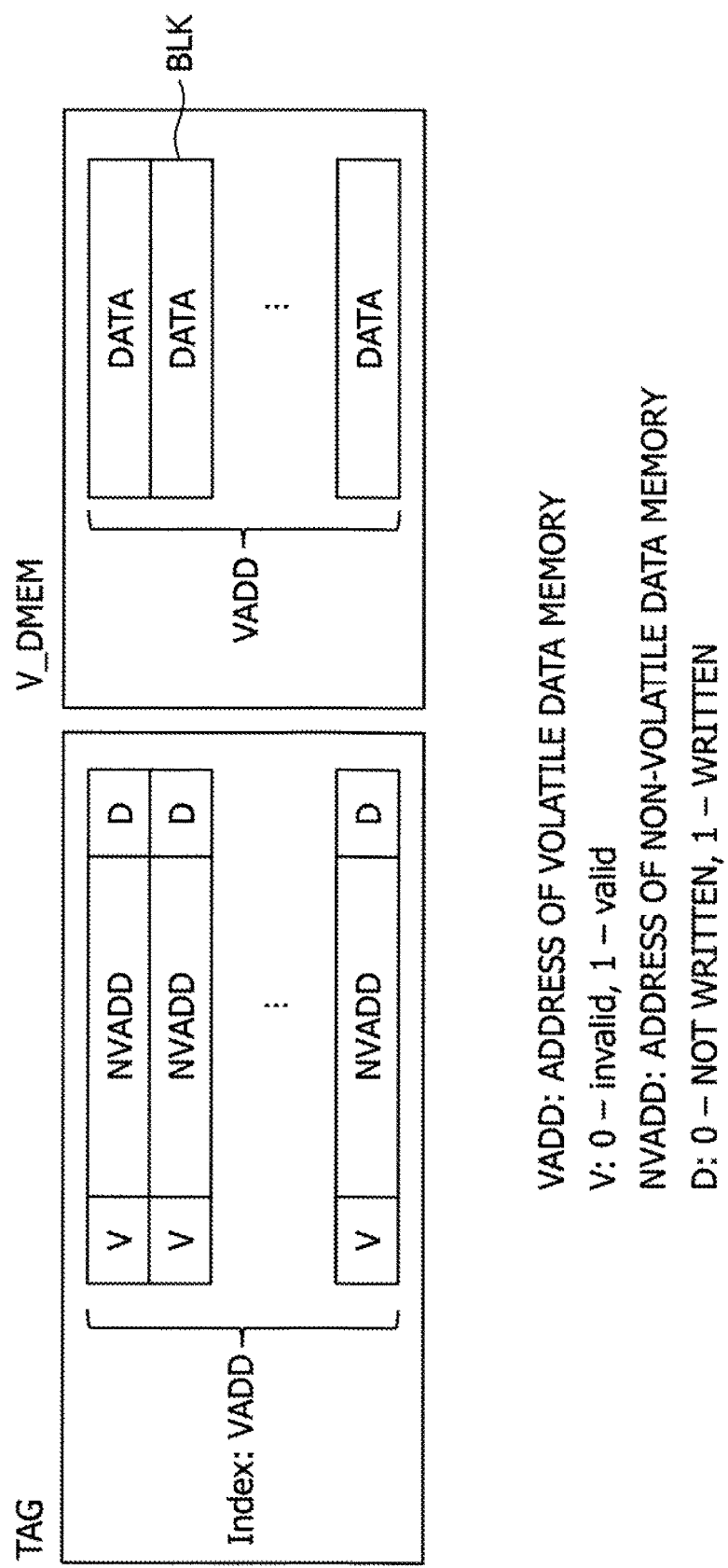
FIG. 5 is a diagram illustrating a configuration example of the volatile tag memory TAG and the volatile data memory V_DMEM.

FIG. 5 is a diagram illustrating a configuration example of the volatile tag memory TAG and the volatile data memory V_DMEM. The volatile data memory V_DMEM includes a plurality of blocks BLK in which data is stored in correspondence with an address VADD. Meanwhile, the index of the volatile tag memory TAG corresponds to the address VADD of the volatile data memory. An entry of each index stores the address of the main memory (an address NVADD of the non-volatile data memory NV_DMEM) corresponding to the data stored in the volatile data memory. A valid bit V indicating whether or not the entry is valid and a dirty bit D indicating whether or not writing has been performed to the data in V_DMEM corresponding to the entry are also stored.

The capacity of data that the volatile data memory V_DMEM is capable of storing is preferably smaller than the capacity of the non-volatile data memory NV_DMEM. Alternatively, the capacity is at most equivalent to that of the non-volatile data memory. A volatile memory is higher in access speed than a non-volatile memory, but higher in cost per bit. As such, preferably, the data capacity of the volatile data memory is V_DMEM smaller than that of the non-volatile data memory NV_DMEM.

Figure 6:
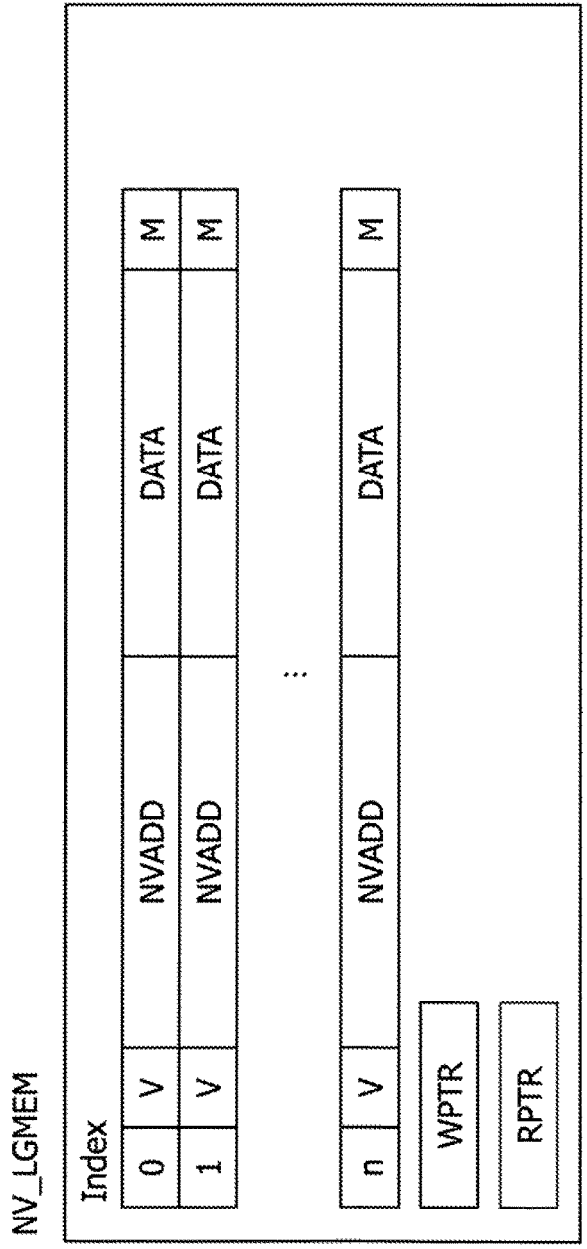
FIG. 6 is a diagram illustrating a configuration example of the non-volatile log memory NV_GMEM.

FIG. 6 is a diagram illustrating a configuration example of the non-volatile log memory NV_LGMEM. The non-volatile log memory includes entries to sufficiently allow storing data of writing that occurs between snapshots. In the example of FIG. 6, there are indices of 0 to n, and the total number of entries is n+1.

For each entry, the address NVADD of the non-volatile data memory NV_DMEM corresponding to a write address, write data DATA, a mark bit M, and the valid bit V are stored. Note that, as will be described later, the valid bit V does not have to be stored.

Aside from the plurality of entries, areas are included that store a write pointer WPTR and a read pointer RPTR. The write pointer WPTR indicates the entry position in which the address and the write data are to be stored at the time of writing. The read pointer RPTR indicates the entry position in which, after the snapshot processing, the write address and the write data are to be read from the non-volatile log memory at the time of copying the written data to the non-volatile data memory.

The initial values of the write pointer WPTR and the read pointer RPTR are both 0. When writing occurs and the writing is performed to the non-volatile log memory, the write pointer is updated. When the copying of the written data to the non-volatile data memory is performed after the snapshot processing, the read pointer is updated. In a normal operation, first, the write pointer is updated in a sequential manner, and, after the snapshot processing, the read pointer is sequentially updated.

The mark bit M is utilized such that the position of M=1 indicates the entry position in which the write history has been written immediately before the time of a snapshot request. That is, in the snapshot processing, the snapshot controller changes the mark bit to M=1 in the entry for which the immediately preceding (the most recent) write history has been written. This processing is completed in a short time.

The valid bit V indicates whether or not the write history of each entry is valid. When the write history is written at the time of writing, a change is made to V=1. When the write data of the write history is written to the non-volatile data memory after the snapshot processing, a change is made to V=0.

Figure 7:
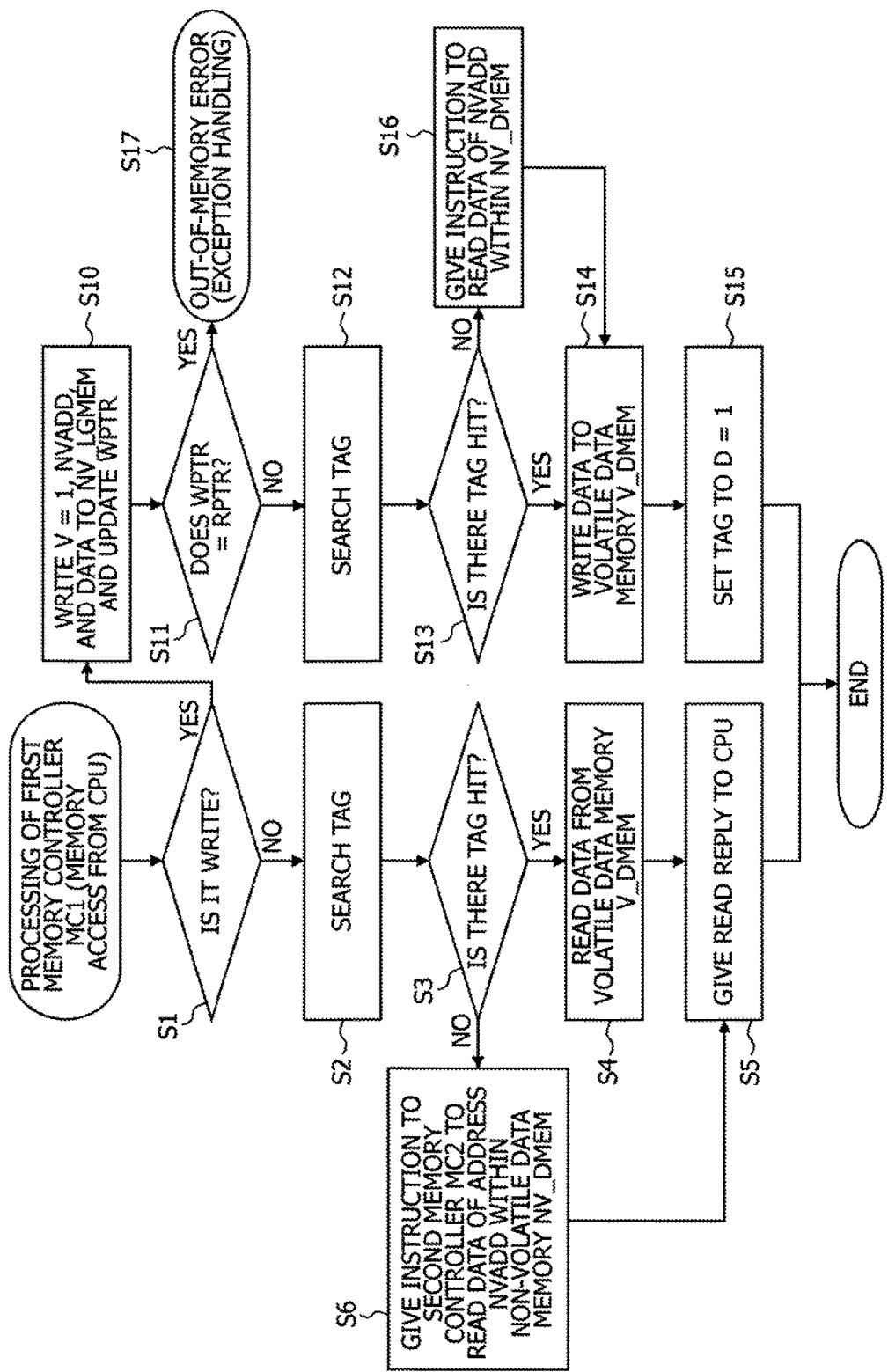
FIG. 7 is a flow chart diagram illustrating the processing of the first memory controller MC1 that operates in response to a memory access request (a read request or a write request) from the processor.

FIG. 7 is a flow chart diagram illustrating the processing of the first memory controller MC1 that operates in response to a memory access request (a read request or a write request) from the processor.

[Read Processing]

First, in the case of the memory access request being a read request (NO in step S1), the first memory controller searches the tag TAG of the volatile memory to check whether or not a valid entry with the read address NVADD exists (whether or not there is a tag hit) (in steps S2 and S3). In the case of a positive (tag hit, YES in step S3), the first memory controller reads data from the volatile data memory V_DMEM (in step S4) and output a read reply to the processor CPU (in step S5).

In the case where the valid entry does not exists (NO in step S3), the first memory controller output an instruction to the second memory controller MC2 to read the data of the read address NVADD in the non-volatile data memory NV_DMEM (in step S6). In response to this instruction, the second memory controller reads the data from the non-volatile data memory and writes the read data into the volatile data memory V_DMEM. The first memory controller output a read reply to the processor CPU with the read data (in step S5).

Figure 8:
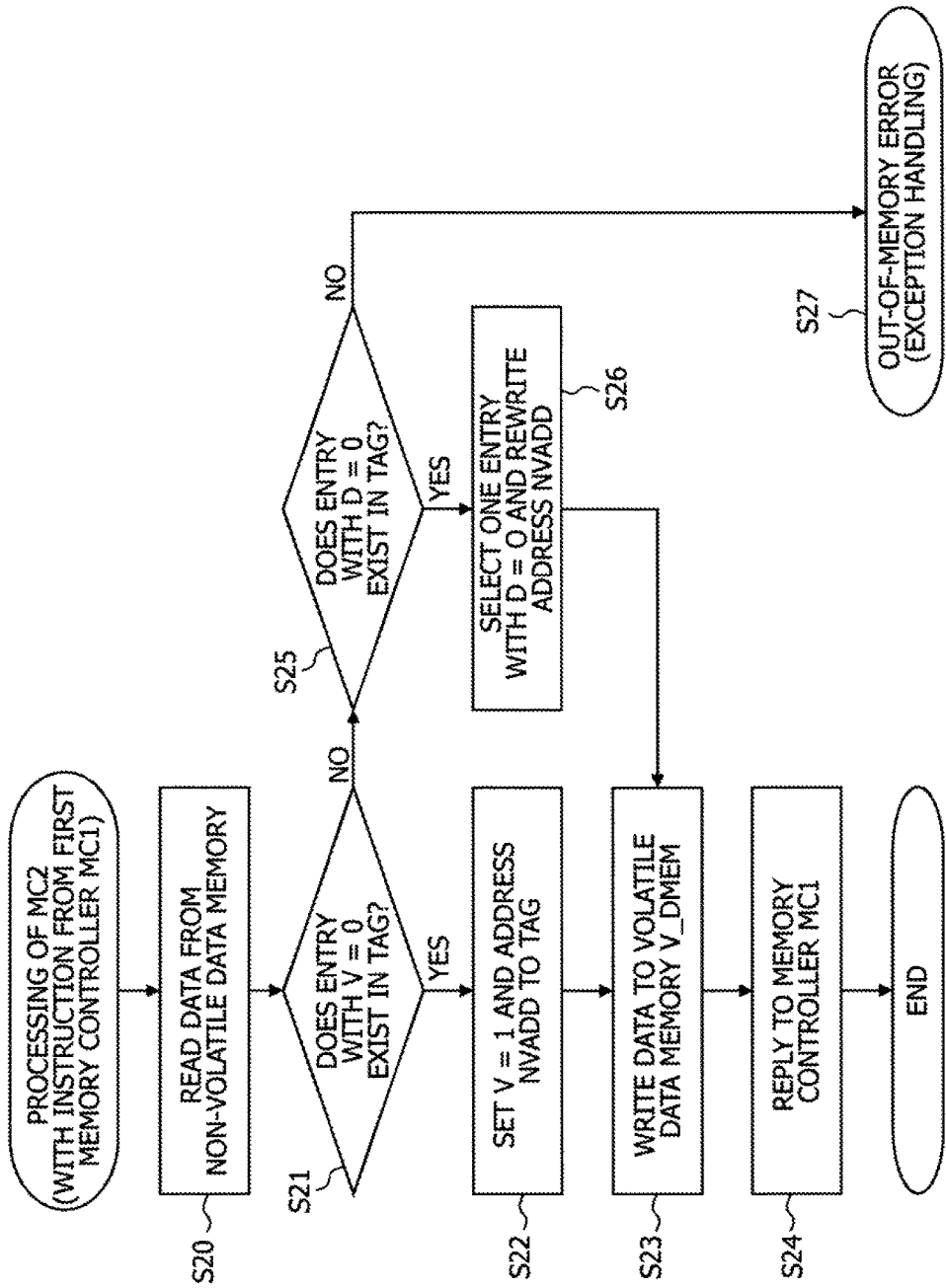
FIG. 8 is a flow chart diagram illustrating the processing of the second memory controller MC2.

FIG. 8 is a flow chart diagram illustrating the processing of the second memory controller MC2. With the second memory controller, the data of the address NVADD in the instruction is read from the non-volatile data memory (in step S20), the read data is written to the volatile data memory, and the address thereof is written to the tag. That is, the second memory controller checks whether an invalid entry (of which the valid bit V equals 0) exists in the tag in the volatile memory (in step S21). In the case of the invalid entry existing (YES in step S21), the valid bit V of 1 and the address NVADD are stored in the entry of the tag (in step S22), and the data is written to a block corresponding to the same entry in the volatile data memory V_DMEM (in step S23). A reply is output to the first memory controller (in step S24).

In the case of an entry with V=0 not existing in the tag (NO in step S21), the second memory controller searches for an entry as a target of replacement with the read data. That is, the second memory controller checks whether an entry with a dirty bit of D=0 (unwritten entry) exists in the tag (in step S25). In the case of the non-dirty entry existing (YES in step S25), one entry with a dirty bit of D=0 is selected, and the address NVADD is written to the entry in the tag (in step S26). The read data is written to the entry of the volatile data memory corresponding to the entry of the tag (in step S23). As a result, the entry is replaced with the new data.

That is, it is demanded that the write data be copied to the non-volatile data memory NV_DMEM from the non-volatile log memory NV_LGMEM for the first time in the snapshot processing and, in normal memory access, the write data be written in the volatile data memory V_DMEM and not copied to the non-volatile data memory. As such, in the case of replacing a block of the volatile data memory, a block with a dirty bit of D=1 is not to be selected as the target of replacement. When an already written block with a dirty bit of D=1 is selected as the target of replacement, the already written data is lost by the replacement, and from then on, the already written data is not able to be read from the volatile data memory when a read request is issued later.

In the case of a dirty bit of D=0 not existing in the tag, an out-of-memory error causes exception handling by an OS (in step S27). From the reason described earlier, the volatile memory is designed to provide a capacity to store read data not being written (non-dirty data), in addition to the capacity to store write data between snapshots. However, in the case where an entry with D=0 does not exist, the number of pieces of the write data is too large, causing the out-of-memory error.

In the exception handling described above, all or a part of the write data in the non-volatile log memory is copied to the non-volatile data memory, and the clearing of all of the tag and the volatile memory or an update of the dirty bit of the copied entry to D=0 is performed, as in the snapshot processing described later, for example.

[Write Processing]

Returning to FIG. 7, in the case of the memory access request being a write request (NO in step S1), the first memory controller stores the write history (the write address and the write data) into the non-volatile log memory and, simultaneously, also writes the write data to the volatile data memory.

That is, the first memory controller writes V=1, the write address NVADD, and the write data DATA to the entry of the write pointer WPTR of the non-volatile log memory NV_L-GMEM and updates (increments by one) the write pointer WPTR (in step S10). Further, the write data is also written to the volatile data memory V_DMEM (in step S14).

When the write pointer WPTR has become equivalent to the read pointer RPTR with the write pointer having been updated (in step S11), this means that the write pointer has caught up with an entry (an entry indicated by the read pointer) that is not copied to the non-volatile data memory yet, causing an out-of-memory error in storing the write history (in step S17). In this case, the OS implements exception handling. For the handling, processing similar to that of the exception handling in step S27 described earlier is performed, and the read pointer is moved forward.

Next, the first memory controller searches the tag TAG of the volatile memory to check whether or not a valid entry having the write address NVADD exists (whether or not there is a tag hit) (in steps S12 and S13). In the case of the valid entry existing (YES in step S13), the first memory controller writes the write data to the block of the entry of the volatile data memory V_DMEM for which there has been a tag hit (in step S14) and sets the corresponding dirty bit in the tag to D=1 (already written) (in step S15).

In the case of the valid entry not existing (NO in step S13), the first memory controller output an instruction to the second memory controller MC2 to read the data of the write address NVADD in the non-volatile data memory NV_D-MEM (in step S16). In response to this instruction, as described with FIG. 8, the second memory controller reads the data from the non-volatile data memory (in step S20 of FIG. 8) and writes the read data to the corresponding entry in the volatile data memory V_DMEM (in step S23 of FIG. 8). The first memory controller overwrites, with the write data, the entry of the volatile data memory V_DMEM in which data has been written (in step S14) and sets the corresponding dirty bit in the corresponding tag to D=1 (already written) (in step S15).

In correspondence with a tag miss (NO in step S13), the second memory controller finds an entry in which V=0 or in which V=1 but D=0 in the tag of the volatile memory, writes the read address NVADD to the entry (in step S22 or S26), and writes the data read from the non-volatile data memory to the volatile data memory V_DMEM (in step S23).

As described above, in the memory access from the processor, the memory controller reads data from the volatile data memory or writes data to the volatile data memory. In the case where the data of the address of the memory access is absent in the volatile data memory, data in the non-volatile data memory is registered in the volatile data memory. With this processing, at least a part of data of the non-volatile data memory is stored in the volatile data memory. Further, in the case of a write request, the memory controller stores the history of the write address and data to the non-volatile log memory, in addition to the volatile data memory.

[Snapshot]

Figure 9:
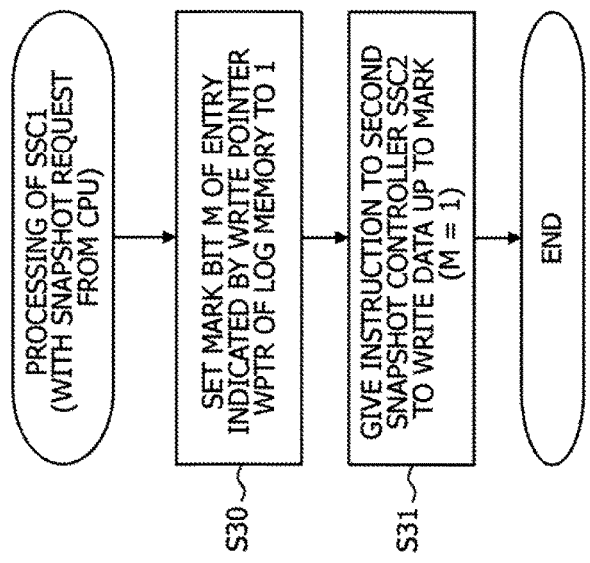
FIG. 9 is a flow chart diagram illustrating the operation of the first snapshot controller SSC1 at the time of a snapshot request from the processor.

FIG. 9 is a flow chart diagram illustrating the operation of the first snapshot controller SSC1 at the time of a snapshot request from the processor. The first snapshot controller SSC1 sets the mark bit M of the entry indicated by the write pointer WPTR in the non-volatile log memory to M=1 (in step S30). This is the snapshot processing. Since an application program that the processor executes is able to resume the processing in execution when the setting the mark bit M to 1 in the snapshot processing is completed, the interrupted time in the processing in execution (the time taken for a snapshot) is short.

The first snapshot controller output an instruction to the second snapshot controller SSC2 to write (copy), to the non-volatile data memory, the data of the entry from the read pointer RPTR up to where the mark bit M equals 1 in the non-volatile log memory (in step S31).

Figure 10:
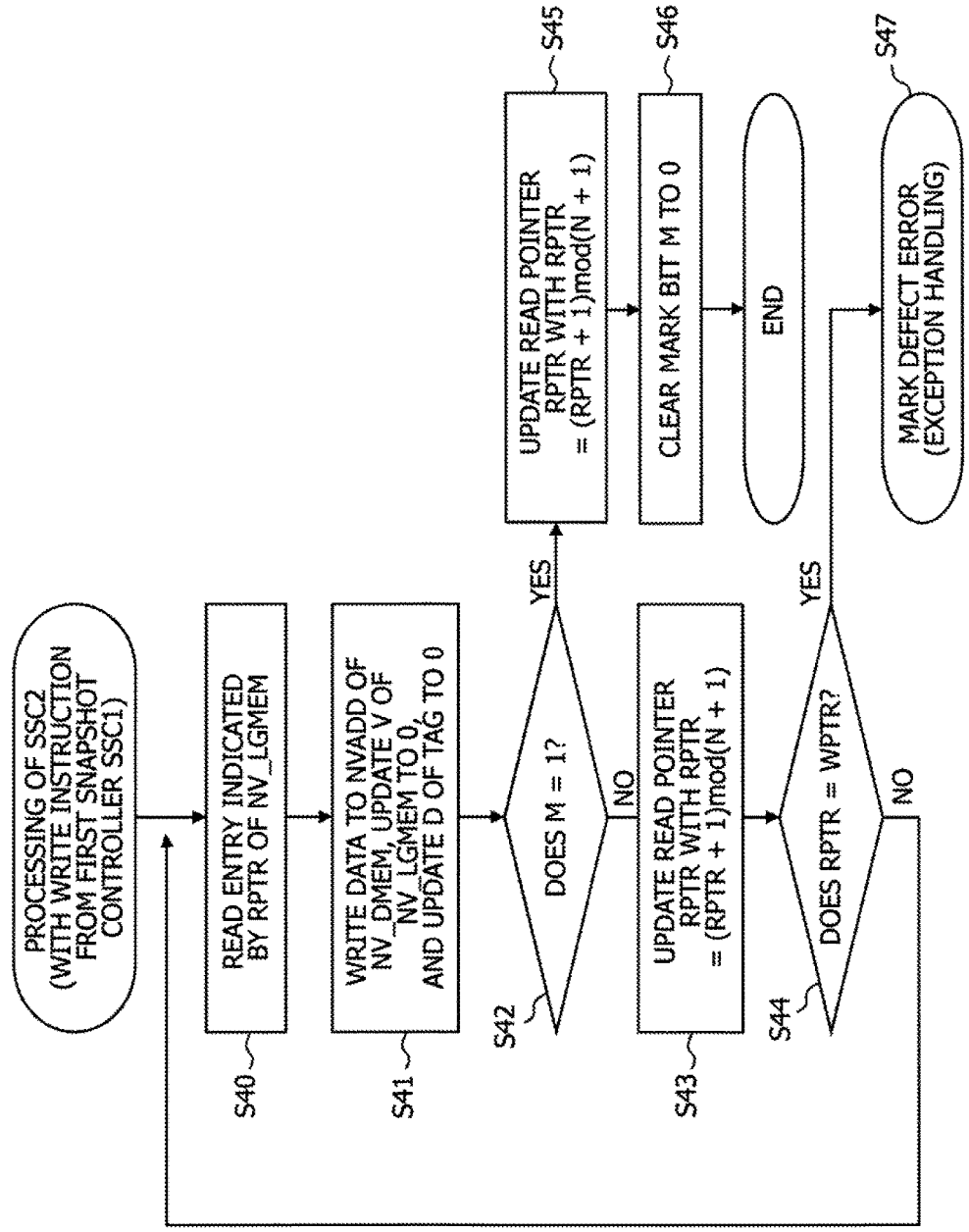
FIG. 10 is a flow chart diagram illustrating the operation of the second snapshot controller SSC2.

FIG. 10 is a flow chart diagram illustrating the operation of the second snapshot controller SSC2. In response to the write instruction from the first snapshot controller SSC1 in FIG. 9, the second snapshot controller reads information (the write address NVADD, the write data DATA, and the mark bit M) of the entry indicated by the read pointer in the non-volatile log memory (in step S40). The write data DATA is written to the block of the write address NVADD in the non-volatile data memory, the valid bit in the non-volatile log memory is updated to V=0, and the dirty bit of the tag TAG of the volatile memory is updated to D=0 (in step S41). In the case where the valid bit is not used for the non-volatile data memory, the update to V=0 is not needed.

Steps S40 and S41 described above are repeated from the entry indicated by the read pointer up to the entry with the mark bit of M=1. As such, the mark bit M of the current entry in the non-volatile log memory not being equal to 1 (NO in step S42) causes the second snapshot controller to update the read pointer RPTR with an increment by one (in step S43). The read pointer not having caught up with the write pointer (the read pointer RPTR not being equal to the write pointer WPTR for "NO" in step S44) causes the processing from step S40 to be repeated. As illustrated in FIG. 6, the read pointer returns to 0 when the read pointer RPTR has been updated from 0 up to n. As such, the position of the read pointer after an update is the remainder value from dividing the value of RPTR+1 after the update by n+1, i.e., RPTR=(RPTR+1)mod(n+1). When the read pointer catches up with the write pointer (YES of S42), there is a mark defect error in which the mark bit M has not been appropriately set to equal 1 in the snapshot processing (in step S47).

When the copying of the write data of the entry to the non-volatile data memory is completed up to where the mark bit M equals 1 (YES in S42), the second snapshot controller updates the read pointer (in step S45). Further, since the mark bit of the entry is M=1 (in step S42), the second snapshot controller clears the mark bit to M=0 (in step S46). Clearing the mark bit to M=0 means that the copying of the write data has been completed.

In the case where the copying, to the non-volatile data memory, of the write data from the read pointer up to the entry of the mark bit M=1 in the non-volatile log memory by the second snapshot controller in FIG. 10 has been completed in a normal manner, that means that all of the data written up to a snapshot have been copied into the non-volatile data memory.

In the case where the power is interrupted due to a failure or the like during the processing of copying in FIG. 10 and the copying of the write data is not completed, the non-volatile log memory is in a state where the entry with a mark bit of M=1 still remains in an entry after the read pointer. Thus, after resuming the operation after the activation of power, the OS checks whether or not there is an entry with a mark bit of M=1 in the non-volatile log memory. In the case where M=1 is present, the copying is incomplete. As such, the operation of copying, to the non-volatile data memory, the write data from the read pointer up to the entry with the mark bit of M=1 in the non-volatile log memory is continued.

[Resuming Operation after Activation of Power after Interruption of Power]

Lastly, the resuming operation by the OS upon the operation being resumed after the activation of power after there has been an interruption of power due to a failure or the like will be described. First, the OS checks whether there is an entry with a mark bit of M=1. No entry of M=1 means that the copying of the write data to the non-volatile data memory in FIG. 10 has been terminated in a normal manner. In that case, the OS clears the volatile data memory and the tag and also clears the write history of the entry from the read pointer and thereafter up to one before the write pointer in the non-volatile log memory. In the non-volatile log memory, there may be an interruption of power in a state where different writing is stored in an entry after the entry if M=1. In that case, in order to resume the operation from the operation after the timing of the snapshot that is taken immediately before the time of the interruption of power, the write data of the write history after the snapshot is deleted (cleared).

In the case where there is an entry with a mark bit of M=1, it means that the copying of the write data to the non-volatile data memory in FIG. 10 is not completed in a normal manner. In that case, the OS continues the copying of the write data to the non-volatile data memory from the read pointer up to the entry with a mark bit of M=1 at the time of the resumption, and the mark bit is cleared to M=0 after completion. In a similar manner to the earlier description, the volatile data memory and the tag are cleared, the write history of the entry from the read pointer and thereafter in the non-volatile log memory is also cleared, the state of the main memory is restored to that of a timing of the snapshot immediately before the time of the interruption of power, and the operation is resumed from the operation after the snapshot.

With FIG. 10, it has been described that the processing of step S46 is performed to clear the mark bit to M=0. However, it may be such that, without clearing the mark bit to M=0 after the completion of the copying of the write data up to the entry if M=1, it may be determined that the copying of the write data to the non-volatile data memory has been completed in a normal manner, when the read pointer RPTR is pointing to the entry next to the entry of M=1, at the time of the resumption of the operation after the interruption of power. It may be determined that the copying has not been completed upon the interruption of power, when the entry indicated by the read pointer RPTR is an entry same as or before the entry of M=1. In the case of the copying not having been completed, the copying is continued, as described earlier. In the case where the copying has been completed or in the case where the copying has not been completed but the copying has been completed thereafter, the mark bit is cleared to M=0.

Further, since entries from the read pointer RPTR up to one before the write pointer WPTR mean valid entries for which the copying to the non-volatile data memory has not been completed, the valid bit V of the non-volatile log memory may be omitted.

[Specific Example of Operation in this Embodiment]

Next, a specific example of the memory access, the snapshot, and the operation after the resumption of the information processing device of this embodiment will be described.

FIG. 11 is a diagram illustrating the operational sequences in the specific example. The operations of sequences SEQ1 to SEQ6 are as follows.

SEQ1: Read operation R to NVADD=5 in a state STATE_0, an example where a tag hit occurs SEQ2: Read operation R to NVADD=6 in a state STATE_1, an example where a tag miss occurs SEQ3: Write operation W to NVADD=1 in a state STATE_2, an example where a tag hit occurs SEQ4: Write operation W to NVADD=2 in a state STATE_3, an example where a tag miss occurs SEQ5: Snapshot instruction in a state STATE_4, an example where copying is completed and an example where copying is not completed SEQ6: Resuming operation after activation of power after interruption of power FIG. 12 is a diagram illustrating the tag, the volatile data memory, the non-volatile log memory, and the non-volatile data memory in the states STATE_0 and STATE_1. In the state STATE_0, V=1 in all of the entries of the tag in the volatile memory are valid (V=1), out of which the entry with NVADD=3 is with a dirty bit of D=1 indicating that there has been writing. For an index 0 in the non-volatile log memory, V=1, and the write history is stored as NVADD=3 and 0x0003 for the write data. As a result, the write pointer WPTR has been updated to "1."

Figure 13:
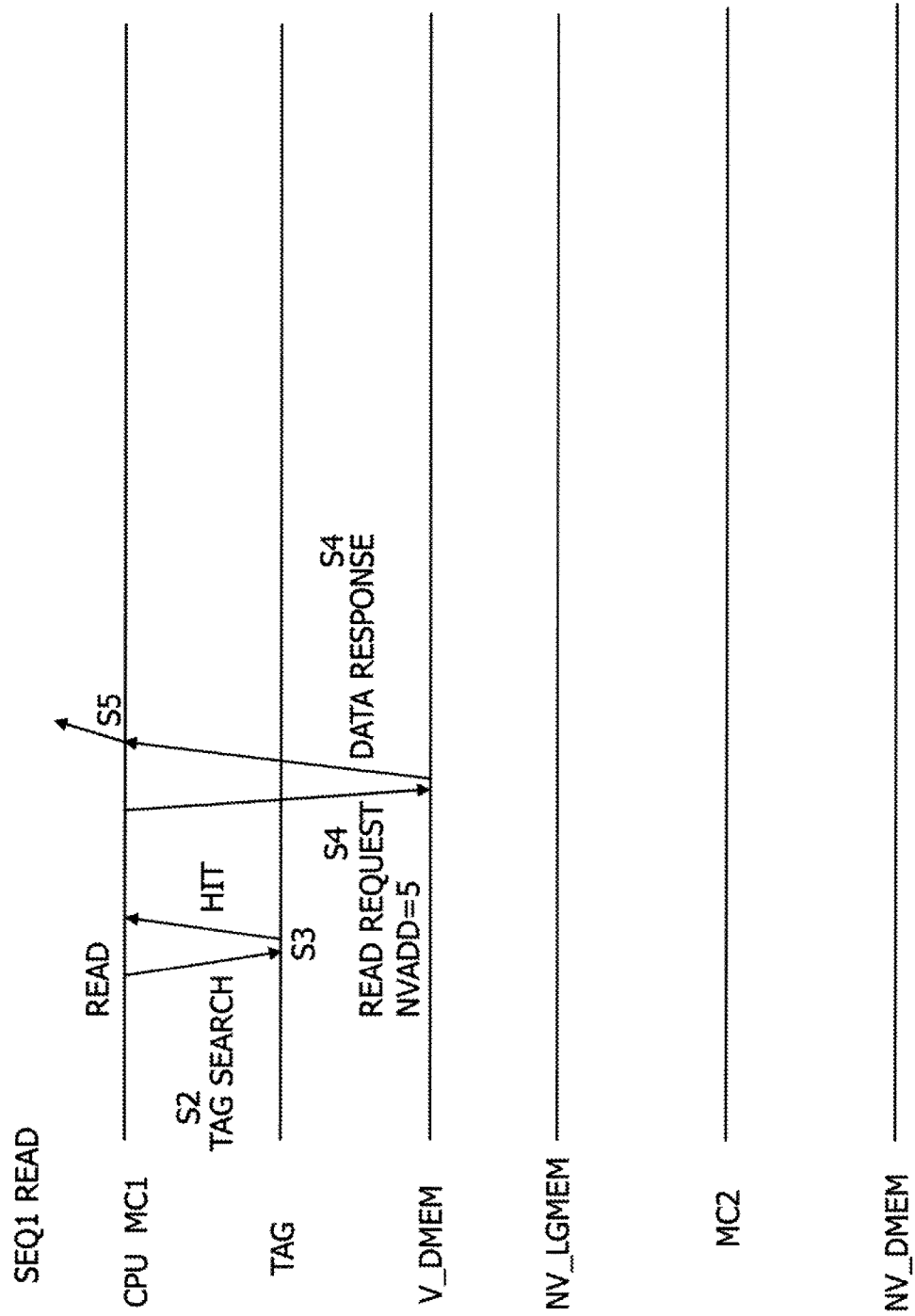
FIG. 13 is a sequence diagram illustrating the operational sequence SEQ1.

FIG. 13 is a sequence diagram illustrating the operational sequence SEQ1. The first memory controller MC1 searches the tag TAG on the basis of the read address NVADD=5 (in step S2), resulting in a tag hit (YES in step S3), reads data of the entry with NVADD=5 of the volatile data memory V_DMEM (in step S4), and output a data response to the processor CPU (in step S5). As such, the state STATE_1 after the completion of the operational sequence SEQ1 is the same as the initial state STATE_0.

Figure 14:
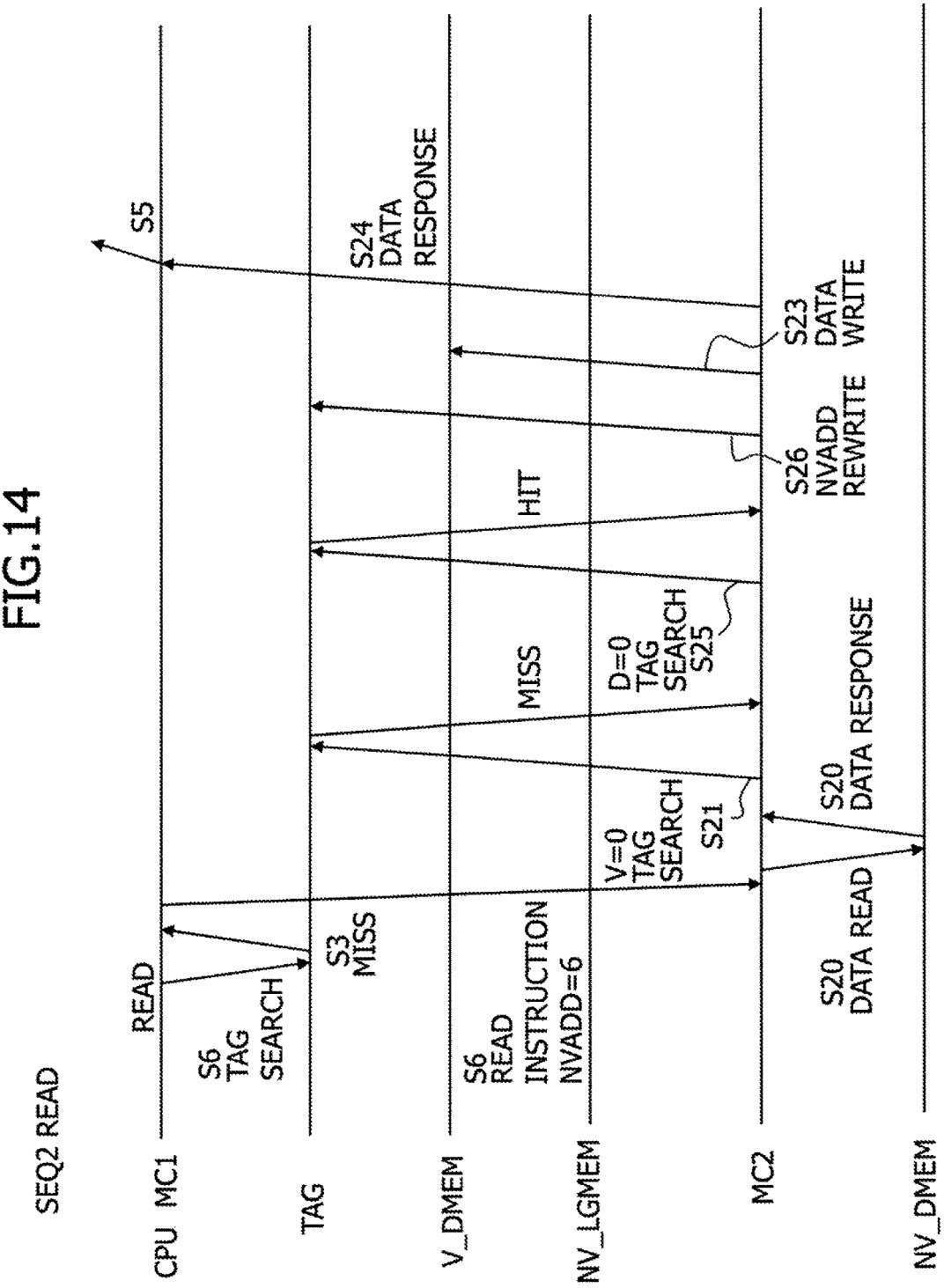
FIG. 14 is a sequence diagram illustrating the operational sequence SEQ2.
Figure 15:
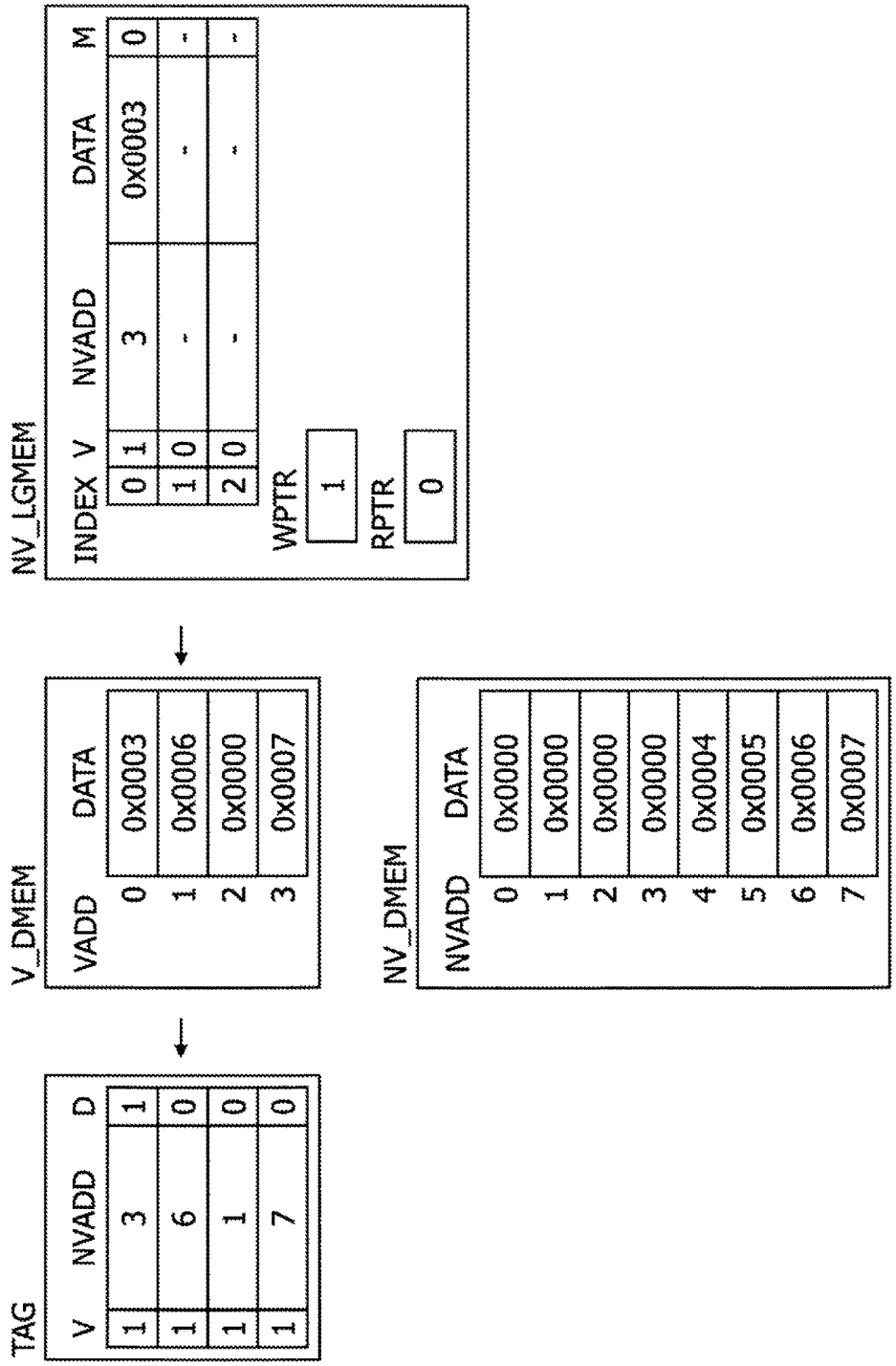
FIG. 15 is a diagram illustrating the state STATE_2 after the operational sequence SEQ2.

FIG. 14 is a sequence diagram illustrating the operational sequence SEQ2. FIG. 15 is a diagram illustrating the state STATE_2 after the operational sequence SEQ2. The first memory controller MC1 searches the tag TAG on the basis of the read address NVADD of 6 (in step S2), resulting in a tag miss (NO in step S3), and output an instruction to the second memory controller MC2 for reading from the non-volatile data memory (in step S6).

In response, the second memory controller MC2 reads data from the non-volatile data memory NV_DMEM (in step S20). Further, the second memory controller MC2 searches for an entry with the valid bit V=0 (as invalid) in the tag TAG (in step S21) and, due to a miss (NO in step S21), searches for an entry with a dirty bit D of 0 (as not yet written) in the tag TAG (in step S25), resulting in a hit (YES in step S25). One of the entries that have been hit is selected, the address of the selected entry is rewritten with the read address NVADD=6 (in step S23), and a data response is output to the first memory controller (in step S24). Further, the first memory controller output a data response to the processor CPU (in step S5).

As a result, in the state STATE_2 in FIG. 15, the address NVADD of the second entry in the tag TAG of the volatile memory is rewritten as NVADD=6, and data of the same entry in the volatile data memory is rewritten to 0x0006.

Figure 16:
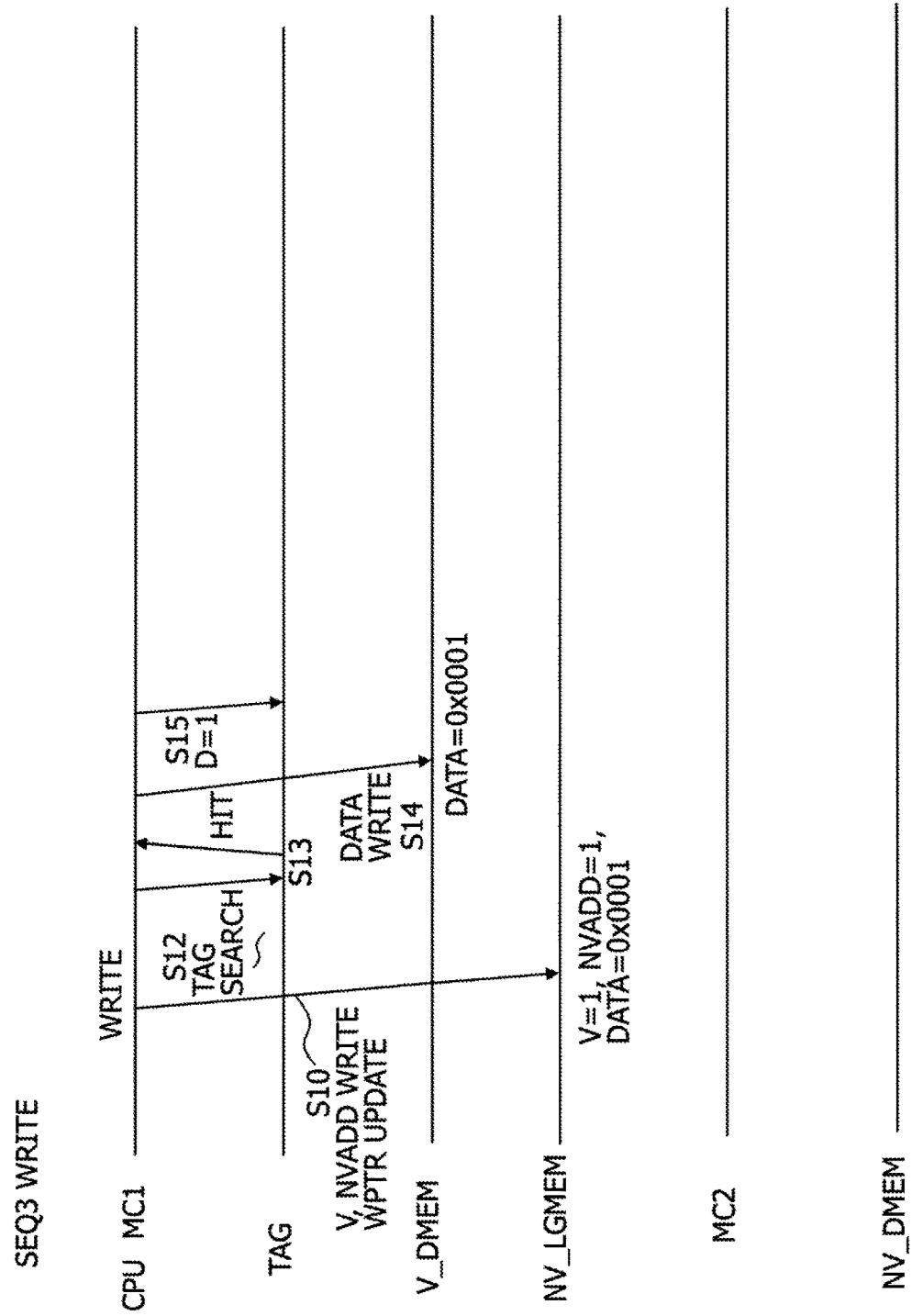
FIG. 16 is a sequence diagram illustrating the operational sequence SEQ3.
Figure 17:
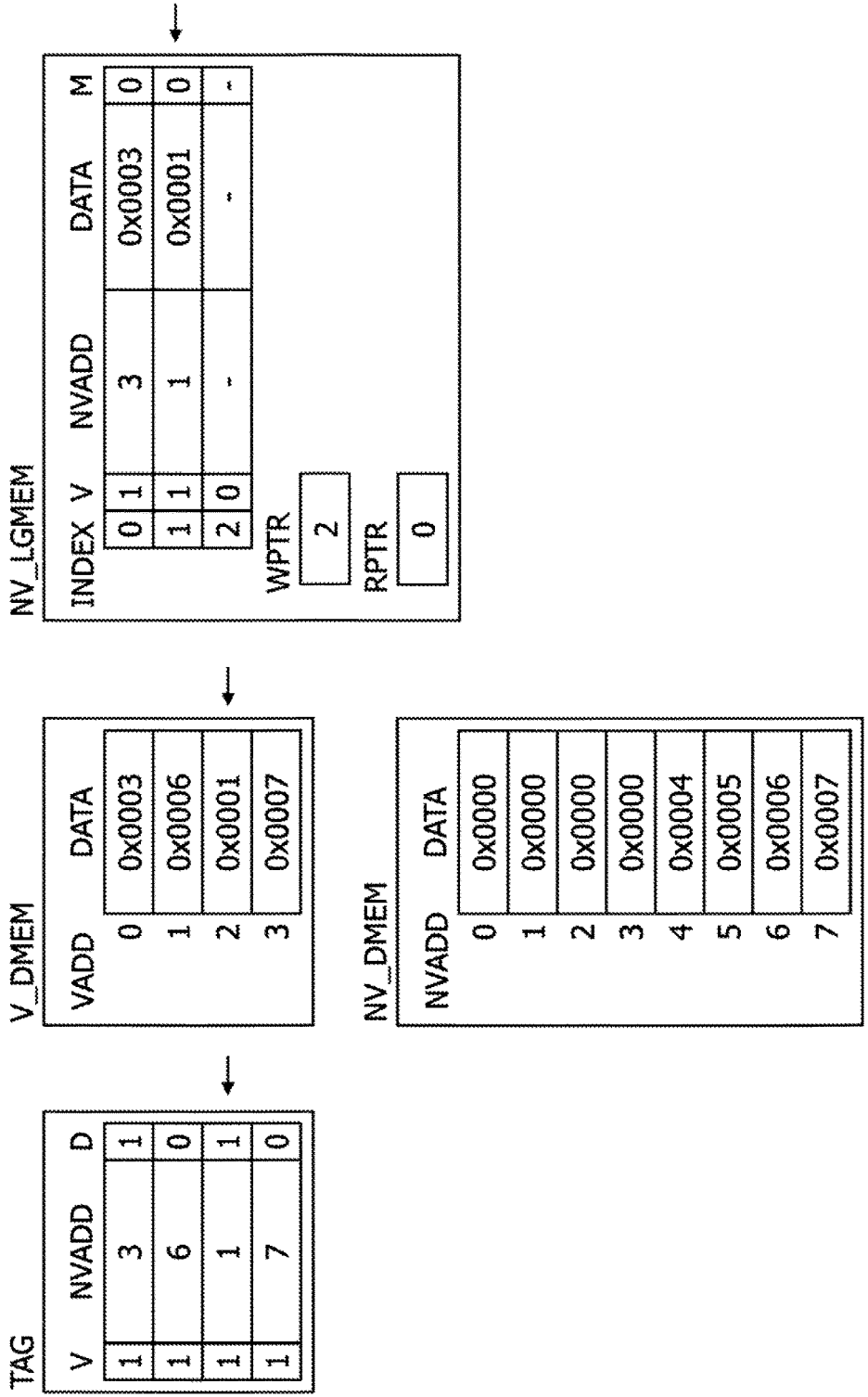
FIG. 17 is a diagram illustrating the state STATE_3 after the operational sequence SEQ3.

FIG. 16 is a sequence diagram illustrating the operational sequence SEQ3. FIG. 17 is a diagram illustrating the state STATE_3 after the operational sequence SEQ3. The first memory controller writes V=1 and the write history (the write address NVADD of 1 and the write data DATA=0x0001) to the non-volatile log memory and updates the write pointer with an increment by one (in step S10). The tag is searched with the address NVADD=1 (in step S12), resulting in a hit (YES in step S13), the write data DATA=0x0001 is written to the entry of the volatile data memory that has been hit (in step S14), and the dirty bit of the tag is changed to D=1 (in step S15).

As a result, in the state STATE_3 in FIG. 17, D=1 is written to the entry of NVADD=1 in the tag TAG, the write data DATA=0x0001 is written to the same entry in the volatile data memory, the write address NVADD=1 and the data DATA=0x0001 are recorded in an index 1 of the non-volatile log memory, and the write pointer is updated to "2."

Figure 18:
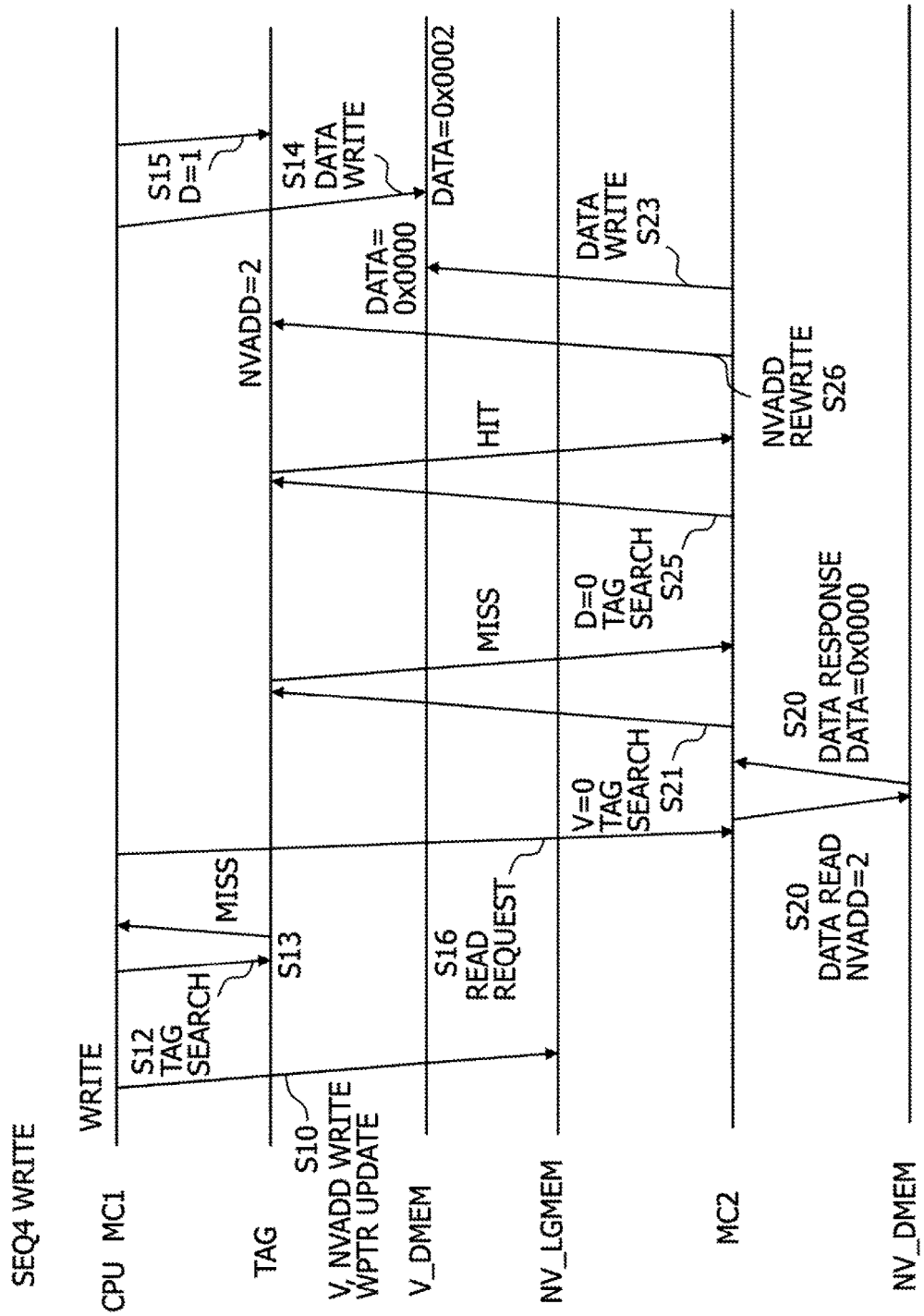
FIG. 18 is a sequence diagram illustrating the operational sequence SEQ4.
Figure 19:
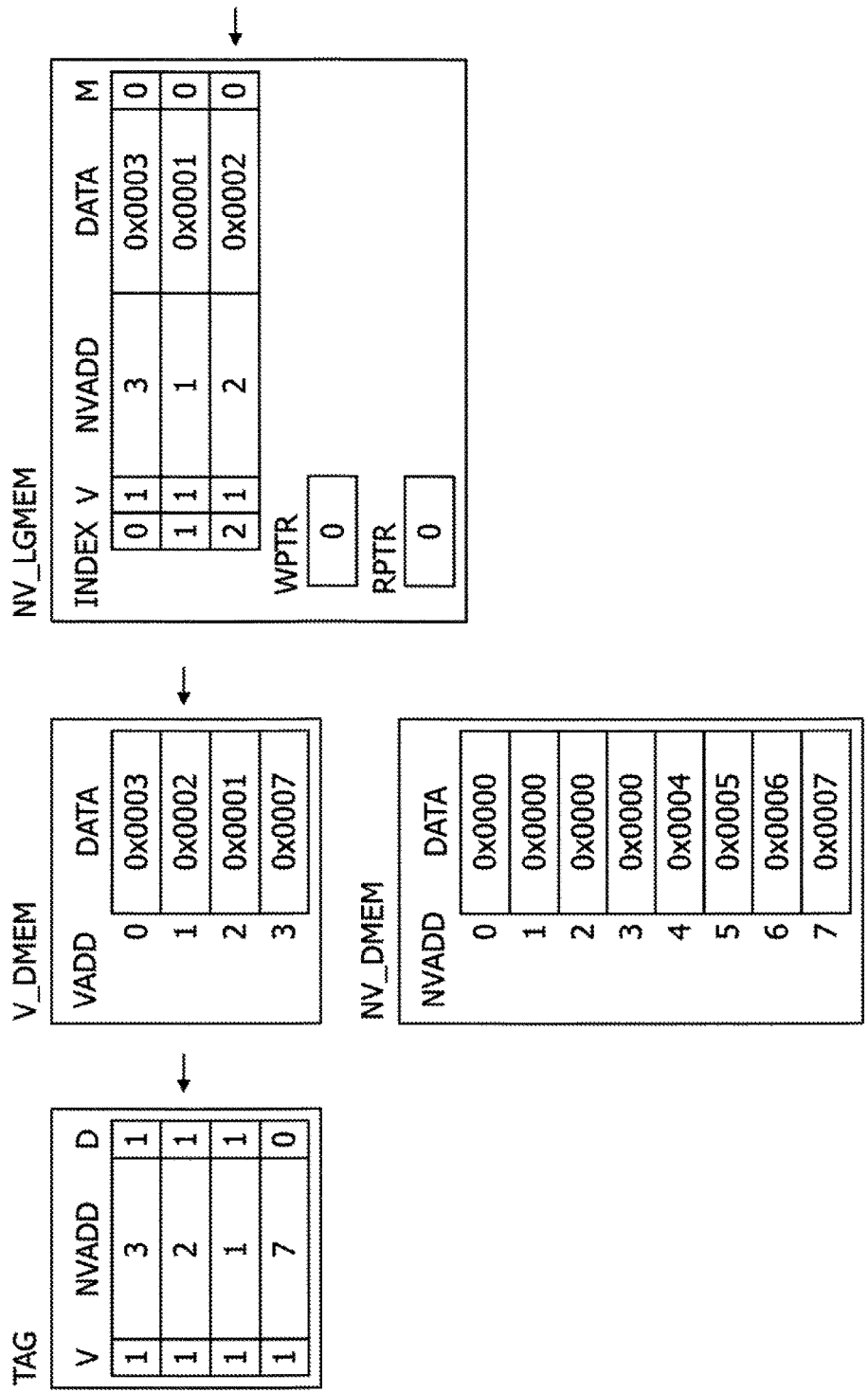
FIG. 19 is a diagram illustrating the state STATE_4 after the operational sequence SEQ4.

Next, FIG. 18 is a sequence diagram illustrating the operational sequence SEQ4. FIG. 19 is a diagram illustrating the state STATE_4 after the operational sequence SEQ4. The first memory controller writes V=1 and the write history (the write address NVADD=1 and the write data DATA=0x0002) in the non-volatile log memory and updates the write pointer with an increment by one (in step S10). The first memory controller searches the tag with address NVADD=2 (in step S12), resulting in a miss (NO in step S13), and instructs to the second memory controller to acquire the data for where NVADD=2 in the non-volatile data memory (in step S16).

The second memory controller performs reading of the data of the non-volatile data memory (in step S20) to read the data DATA=0x0000. Further, the second memory controller searches for V=0 in the tag TAG (in step S21), resulting in a miss, and further searches for D=0 in the tag TAG (in step S25), resulting in a hit. One of the entries that have been hit is selected, the address of the entry of the tag is rewritten with the write address NVADD=2 (in step S26), and the data in the same entry of the volatile memory is rewritten with the read data DATA=0x0000 (in step S23).

Then, the first memory controller rewrites the data of the same entry in the volatile data memory with the write data DATA=0x0002 (in step S14) and further changes the dirty bit of the same entry in the tag TAG to D=1 (in step S15)

As a result, in the state STATE_4 in FIG. 19, the address of the second entry in the tag TAG of the volatile memory is rewritten to NVADD=2, the dirty bit of the entry is changed to D=1, and the write data DATA=f 0x0002 is written to the same entry in the volatile data memory. The write address NVADD=2 and the data DATA=0x0002 are stored to an index 2 of the non-volatile log memory, and the write pointer is updated to "0."

Figure 20:
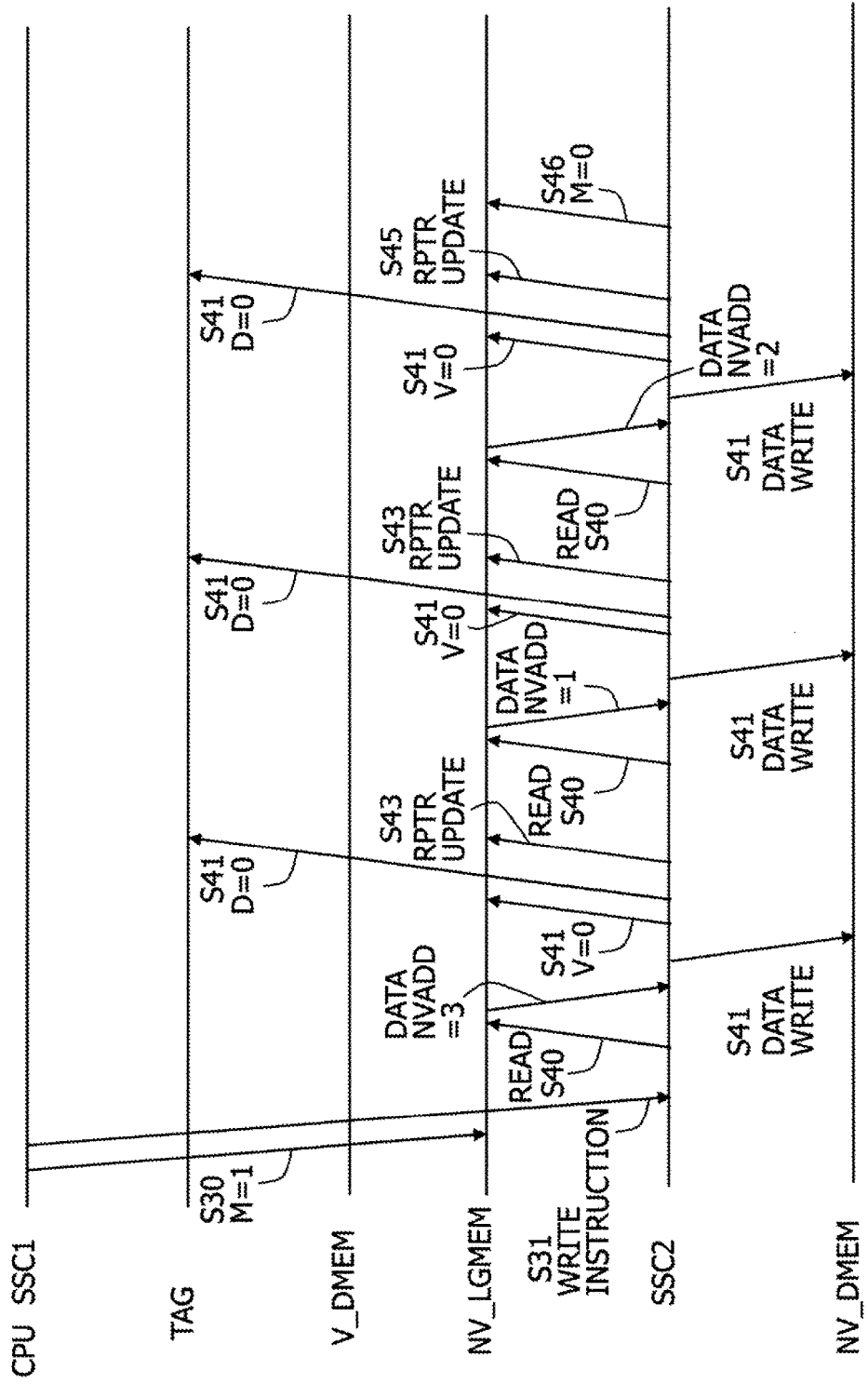
FIG. 20 is a sequence diagram illustrating the operational sequence SEQ5.

FIG. 20 is a sequence diagram illustrating the operational sequence SEQ5. The first snapshot controller sets the mark bit of the entry indicated by the write pointer WPTR of the non-volatile log memory to M=1 (in step S30). This completes the snapshot processing.

Instead of recording the mark bit M=1 in the entry of the write pointer WPTR, the read pointer RPTR and the write pointer WPTR at the time of the snapshot request may be recorded as position information of the write history up to the snapshot. That is, from the read pointer up to the write pointer is the position information where the write history is recorded up to the snapshot. Since the read pointer is not updated until the data restoration processing, only the value of the write pointer WPTR at the time of the snapshot request may be recorded. In this case, the storage area storing the position information of the write history up to the snapshot is provided in the non-volatile log memory.

Next, an instruction is given to the second snapshot controller to write, to the non-volatile data memory, the data of the write history from the entry indicated by the read pointer RPTR up to the entry with a mark bit M=1 (in step S31). This is the data restoration processing.

In the data restoration processing after the snapshot processing, the second snapshot controller reads the write history (the write address NVADD=3 and the write data DATA=0x0003) of the entry indicated by the read pointer (RPTR, which equals 0) in the non-volatile log memory (in step S40). The write data is written at the write address in the non-volatile data memory, the valid bit of the entry of the non-volatile log memory is updated to V=0 and the dirty bit for the same write address in the tag TAG is updated to D=0 (in step S41), and the read pointer is updated with an increment by one (to RPTR=1) (in step S43).

Next, the second snapshot controller reads the write history (the write address NVADD=1 and the data DATA=0x0001) of the entry indicated by the read pointer (RPTR, which equals 1) in the non-volatile log memory (in step S40). In a similar manner to the earlier description, the write data is written to the non-volatile data memory, the valid bit in the non-volatile log memory is updated to V=0 and the dirty bit in the tag is updated to D=0 (in step S41), and the read pointer is updated with an increment by one to RPTR=2 (in step S43)

Further, the second snapshot controller performs the processing that is similar to that described above, for the write history of the read pointer RPTR of 2. As a result, the mark bit of the read pointer indicates M=1, the read pointer is updated (in step S45), and the mark bit is cleared to M=0 (in step S46).

Figure 21:
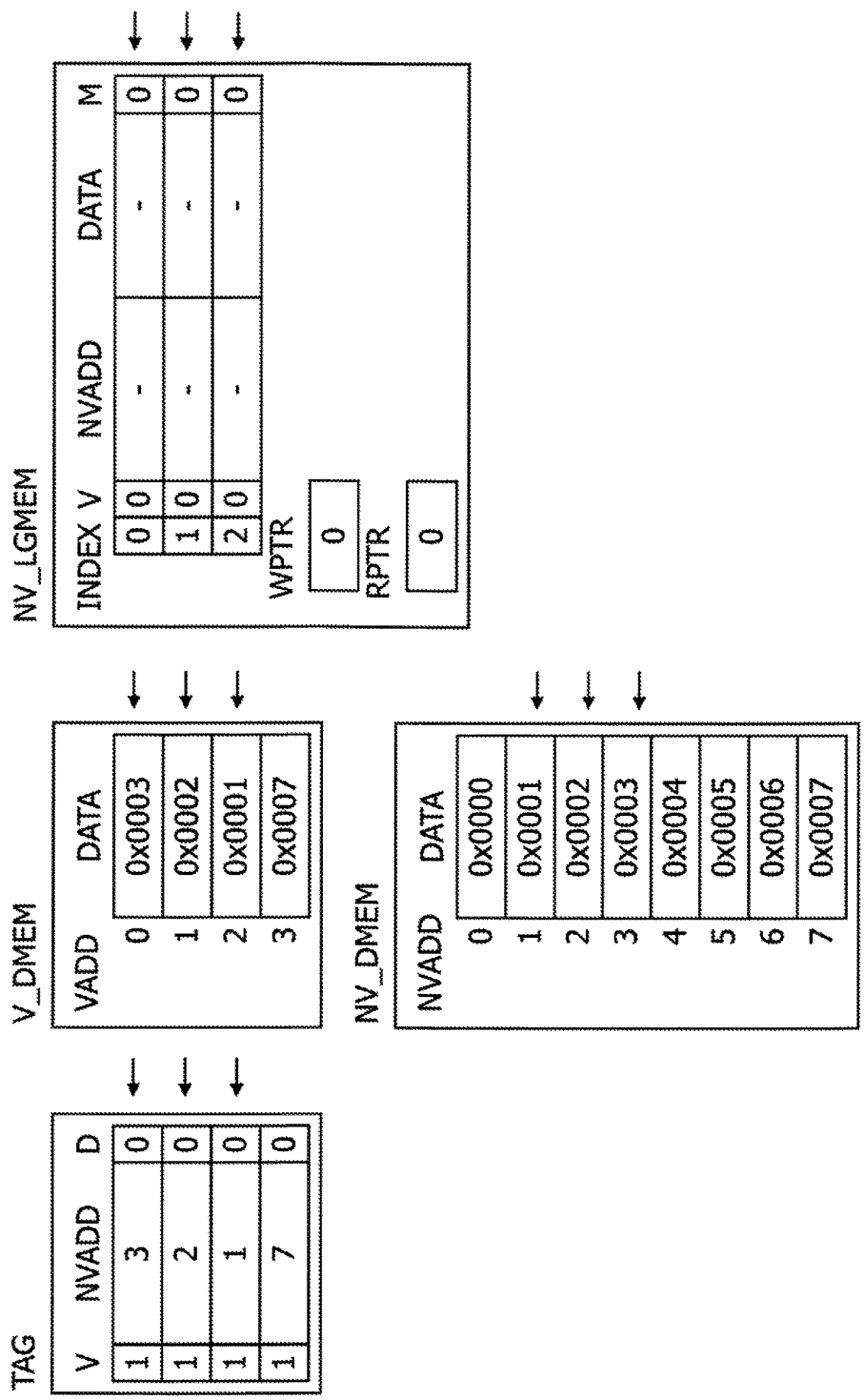
FIG. 21 is a diagram illustrating a state STATE_5A of a case where it is after the snapshot create instruction in the sequence SEQ5 and the copying of the write data that is the data restoration processing has been completed.

FIG. 21 is a diagram illustrating a state STATE_5A of a case where it is after the snapshot instruction in the sequence SEQ5 and the copying of the write data in the data restoration processing has been completed. The three pieces of write data in the non-volatile log memory indicated by the arrows have all been copied to the non-volatile data memory, the three dirty bits in the tag have been updated to D=0, the mark bit of the index 2 in the non-volatile log memory has been cleared to M=0, and the read pointer RPTR has been updated to 0. When the power is interrupted in such a state STATE_5A and then the operation is resumed with the activation of power, the OS detects that the copying, from the non-volatile log memory to the non-volatile data memory, of the write data up to the time of the snapshot immediately before the interruption of power has been completed, since the mark bit M of 1 does not exist in the non-volatile log memory.

Figure 22:
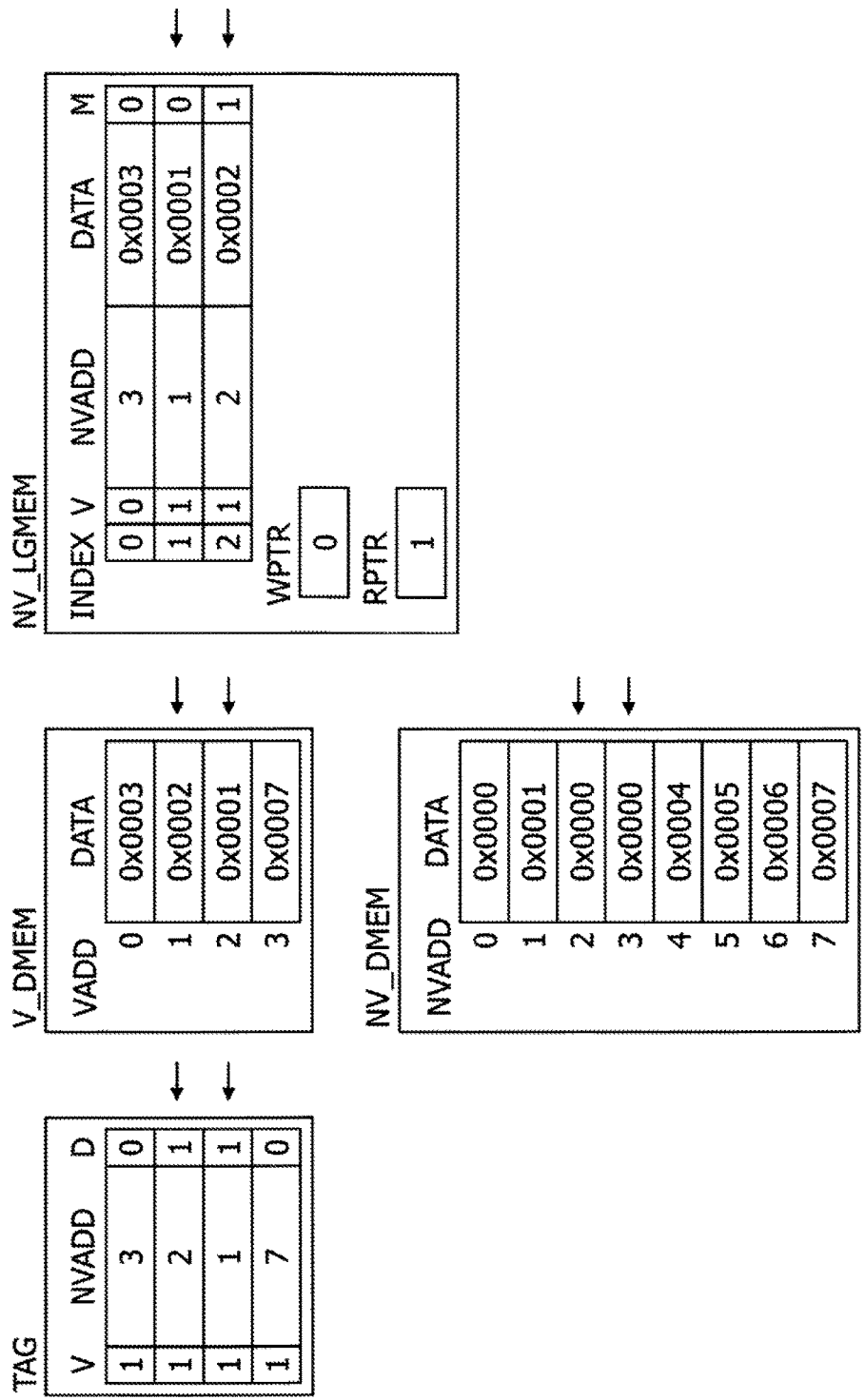
FIG. 22 is a diagram illustrating a state STATE_5B of a case where it is after the snapshot create instruction in the sequence SEQ5 and the copying of the write data that is the data restoration processing is incomplete.

FIG. 22 is a diagram illustrating a state STATE_5B of a case where it is after the snapshot instruction in the sequence SEQ5 and the copying of the write data in the data restoration processing is incomplete. In the state, only the index 0 out of the three pieces of write data in the non-volatile log memory has been copied to the non-volatile data memory, and the power has been interrupted before the write data of the remaining indices 1 and 2 indicated by the arrows is copied. As a result, the mark bit M=1 of the index 2 is still remaining. When the power is interrupted in such a state STATE_5B and then the operation is resumed with the activation of power, the OS detects that the copying of the write data at the time of the immediately before snapshot has been incomplete, since the mark bit M=1 exists in the non-volatile log memory.

The OS output an instruction to the second snapshot controller for the copying, to the non-volatile data memory, of the write data from the read pointer RPTR=1 up to the where the mark bit M=1. The resulting state is the state STATE_5B in FIG. 21.

FIG. 23 is a diagram illustrating a state STATE_6 after the initializing processing after the resumption of the operation after the activation of power. Firstly, in the initializing processing, the tag TAG is all cleared, all of the valid bits are made to be V=0 (invalid), and the dirty bits are made to be D=0. As a result, the data of the volatile data memory is all cleared. The write data after the entry with a mark bit of M=1 (in the position of the read pointer) up to the write pointer WPTR in the non-volatile log memory is also cleared. In this case, since the write data up to the entry with the mark bit of M=1 having been copied to the non-volatile data memory, the valid bit is made invalid (to be V=0). As such, after all, all of the write data in the non-volatile log memory may be cleared.

Comparing the information processing device on the right side in FIG. 2 and that of this embodiment, the application execution speeds of the two are as follows, when the data write speed of the non-volatile memory is T (bytes/s), the average write speed of data by the processor CPU is W (bytes/s), the average interval of snapshots is t (s), and the execution speed of the application program in the case of not acquiring a snapshot is 1.

Information processing device on right in FIG. 2: t/{t+(tW)/T}

Information processing device of this embodiment: approximately equal to 1

This is because, in the case of FIG. 2, the amount of data written between snapshots is tW (bytes), and the time to write the same to the non-volatile memory at the time of a snapshot is tW/T (s). As a result, the writing time tW/T (s) for a snapshot is added to each average interval time t of the snapshots. As such, the application execution speed of the information processing device is t/{t+(tW)/T} (s). Since the time taken for a snapshot in this embodiment is substantially 0, the application execution speed is substantially the same as the application speed of 1 for a case of not acquiring a snapshot.

With this embodiment, as in the above, writing is performed on the volatile data memory, and the write history is stored in the non-volatile log memory. Reading and writing are performed to the volatile data memory, and when data of the access address does not exist in the volatile data memory, data in the non-volatile data memory is registered in the volatile data memory and reading and writing are performed to the volatile data memory. In the processing at the time of a snapshot, a mark bit of M=1 is recorded in the entry position of the write history most recently stored in the non-volatile log memory. As such, the processing time for the snapshot is short. Accordingly, even when the power is then interrupted, information to allow the restoration of original data of the main memory remains in the non-volatile memory. After the snapshot processing, the write data is copied to the non-volatile data memory on the basis of the write history up to where the mark bit M equals 1.

Using the volatile memory and the non-volatile memory in combination as the main memory in this manner allows the processing time for a snapshot to be made short and data up to a snapshot to be restored after an unexpected interruption of power.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a main memory that includes a non-volatile memory and a volatile memory that has access speed higher than the non-volatile memory, the volatile memory storing at least a part of data in a data area of the non-volatile memory;
a processor that issues a read request, a write request and a snapshot request to data in the main memory; and
a memory controller that processes the request from the processor, the memory controller:
reads, in response to the read request, data corresponding to the read request in the volatile memory,
writes, in response to the write request, write data to an area corresponding to the write request in the volatile memory and also writes a write history in a sequential manner to one of a plurality of entries of a log memory area in the non-volatile memory,
performs, in response to the snapshot request, snapshot processing of recording a mark bit having a first value in the entry in which the write history is written immediately before a time of the snapshot request,
performs, after the snapshot processing, data restoration processing of writing write data of the write history written in an entry or entries, up to the entry in which the mark bit having the first value is recorded, among the plurality of entries of the log memory area to a data area of the non-volatile memory, and changes the mark bit having the first value to a second value when the data restoration processing is completed, and
when an operation is resumed after the snapshot processing,
performs the data restoration processing if the mark bit having the first value is recorded in an entry of the log memory area, and changes the mark bit having the first value to the second value when the data restoration processing is completed, and
does not perform the data restoration processing if the mark bit having the first value is not recorded in an entry of the log memory area.

2. The information processing device according to claim 1, wherein
the memory controller clears, when an operation is resumed after an interruption of power after the snapshot processing, data in the volatile memory and also clears the write history written after the snapshot in the non-volatile memory, and
writes, in response to the read request, data at an address of the read request in a data area of the non-volatile memory into the volatile memory and output a data response to the processor.

3. The information processing device according to claim 1, wherein
the write history includes a write address and write data, and
the memory controller, in the data restoration processing, writes the write data to a data area of the non-volatile memory, based on the write address in the write history.

4. The information processing device according to claim 3, wherein
- each of the plurality of entries of the log memory area records each write address, write data, and the mark bit, and
- the memory controller reads the written data in the entry for up to the entry in which the mark bit having the first value is recorded and writes the written data that is read in a data area of the non-volatile memory in the data restoration processing.

5. The information processing device according to claim 4, wherein
- the log memory area further stores a read pointer indicating a read position for the write history in the entry,
- the read pointer is updated each time the written data in the entry is read and written to a data area of the non-volatile memory in the data restoration processing, and
- the data restoration processing is performed from an entry of the read pointer up to an entry of the mark bit having the first value.

6. The information processing device according to claim 1, wherein, in response to the read request, the memory controller reads data in the volatile memory, in a case where data corresponding to the read request is stored in the volatile memory, or reads data in a data area of the non-volatile memory and writes the read data into the volatile memory, in a case where the data corresponding to the read request is not stored in the volatile memory.

7. The information processing device according to claim 6, wherein, in response to the write request, the memory controller overwrites data of the volatile memory with the write data, in a case where data of an address of the write request is stored in the volatile memory, or reads data in a data area of the non-volatile memory and writes the read data to the volatile memory, and implements moreover overwriting with the write data, in a case where the data of an address of the write request is not stored in the volatile memory.

8. The information processing device according to claim 7, wherein the memory controller,
- in processing of the write request, records a dirty bit in an entry in which overwriting with the write data is overwritten in the volatile memory, and
- in processing of the read request and the write request, writes to an entry in which the dirty bit is not recorded, when data read from a data area of the non-volatile memory is written into the volatile memory.

9. The information processing device according to claim 1, wherein the memory controller and the processor are stored in a common package.

10. The information processing device according to claim 1, wherein the memory controller is formed in the processor.

11. A memory controller that processes a request from a processor included in an information processing device, the memory controller executes processes comprising:
- the information processing includes a main memory that includes a non-volatile memory and a volatile memory that has access speed higher than the non-volatile memory, the volatile memory storing at least a part of data in a data area of the non-volatile memory, and the processor issues a read request, a write request and a snapshot request to data in the main memory,
- reading, in response to the read request, data corresponding to the read request in the volatile memory,
- writing, in response to the write request, write data to an area corresponding to the write request in the volatile memory and also writes a write history in a sequential manner to one of a plurality of entries of a log memory area in the non-volatile memory,
- performing, in response to the snapshot request, snapshot processing of recording a mark bit having a first value in the entry in which the write history is written immediately before a time of the snapshot request,
- performing, after the snapshot processing, data restoration processing of writing write data of the write history written in an entry or entries, up to the entry in which the mark bit having the first value is recorded, among the plurality of entries of the log memory area to a data area of the non-volatile memory, and changing the mark bit having the first value to a second value when the data restoration processing is completed, and
- when an operation is resumed after the snapshot processing,
  - performing the data restoration processing if the mark bit having the first value is recorded in an entry of the log memory area, and changing the mark bit having the first value to the second value when the data restoration processing is completed, and
  - not performing the data restoration processing if the mark bit having the first value is not recorded in an entry of the log memory area.

* * * * *